(12) United States Patent
Chang et al.

(10) Patent No.: US 11,263,431 B2
(45) Date of Patent: Mar. 1, 2022

(54) AUTOMOBILE IDENTIFICATION SYSTEM

(71) Applicant: ABILITY OPTO-ELECTRONICS TECHNOLOGY CO. LTD., Taichung (TW)

(72) Inventors: Yeong-Ming Chang, Taichung (TW); Chien-Hsun Lai, Taichung (TW); Shu-Han Chen, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 70 days.

(21) Appl. No.: 16/532,987

(22) Filed: Aug. 6, 2019

(65) Prior Publication Data

US 2020/0293745 A1  Sep. 17, 2020

(30) Foreign Application Priority Data

Mar. 14, 2019  (TW) .................. 108108577

(51) Int. Cl.
| | |
|---|---|
| *G06K 9/00* | (2006.01) |
| *B60R 25/25* | (2013.01) |
| *B60R 25/01* | (2013.01) |
| *B60R 25/06* | (2006.01) |
| *B60R 25/30* | (2013.01) |
| *G02B 9/34* | (2006.01) |
| *G02B 13/00* | (2006.01) |
| *G02B 9/62* | (2006.01) |

(Continued)

(52) U.S. Cl.
CPC ........ *G06K 9/00087* (2013.01); *B60R 25/012* (2013.01); *B60R 25/014* (2013.01); *B60R 25/06* (2013.01); *B60R 25/252* (2013.01); *B60R 25/305* (2013.01); *G06K 9/0002* (2013.01); *G06K 9/0004* (2013.01); *G02B 9/12* (2013.01); *G02B 9/34* (2013.01); *G02B 9/60* (2013.01); *G02B 9/62* (2013.01); *G02B 13/004* (2013.01); *G02B 13/0035* (2013.01); *G02B 13/0045* (2013.01)

(58) Field of Classification Search
CPC ............. G06K 9/00087; G06K 9/0002; G06K 9/0004; B60R 25/012; B60R 25/014; B60R 25/06; B60R 25/252; B60R 25/305; G02B 9/12; G02B 9/34; G02B 9/60; G02B 9/62; G02B 13/0035; G02B 13/004; G02B 13/0045
See application file for complete search history.

(56) References Cited

U.S. PATENT DOCUMENTS 6,100,811 A * 8/2000 Hsu .................... B60H 1/00642
340/426.36
10,859,786 B2 * 12/2020 Chang .................. H04N 5/2254
(Continued)

*Primary Examiner* — Ping Y Hsieh
*Assistant Examiner* — Xiao Liu
(74) *Attorney, Agent, or Firm* — Wang Law Firm, Inc.

(57) ABSTRACT

An automobile identification system utilizes fingerprint sensors disposed an exterior and interior of an automobile to obtain fingerprint images. By means of the reference fingerprint image stored in the database and the determination of the processor, the automobile identification system determines whether the person who attempts to enter the automobile is a driver or not. The automobile identification system does not need the conventional key to open the door of the automobile and activate the engine of the automobile.

26 Claims, 12 Drawing Sheets

(51) Int. Cl.
  *G02B 9/60* (2006.01)
  *G02B 9/12* (2006.01)

(56) References Cited

U.S. PATENT DOCUMENTS

| | | | |
|---|---|---|---|
| 2006/0056663 A1* | 3/2006 | Call | G06K 9/0002 382/115 |
| 2014/0070917 A1* | 3/2014 | Protopapas | B60R 25/25 340/3.1 |
| 2019/0130083 A1* | 5/2019 | Agassy | G06K 9/00087 |
| 2020/0150387 A1* | 5/2020 | Kim | H04N 5/2354 |

\* cited by examiner

AUTOMOBILE IDENTIFICATION SYSTEM

CROSS-REFFERENCE TO RELATED APPLICATION

This application claims priority from Taiwan Patent Application No. 108108577, filed on Mar. 14, 2019, in the Taiwan Intellectual Property Office, the content of which is hereby incorporated by reference in its entirety for all purposes.

BACKGROUND OF THE INVENTION

1. Field of the Invention

The present invention relates to an automobile identification system for confirming a driver by using a dual determination of a fingerprint sensor and a processor disposed on an interior or exterior of the automobile.

2. Description of the Related Art

In the era of ever-changing technology, automobiles have become an indispensable means of transportation. Currently, a metal key or a wafer key is still required for the opening of a car door and the activation of a car engine. However, when forgetting to have the metal key or wafer key around, a driver has to seek for a locksmith for unlocking the door of the automobile, resulting in inconvenience and a waste of money.

In addition, the unlocking technique has also improved as technology advances. It is not difficult for a person who plans to copy a metal key or a wafer key or directly unlock an automobile. Thus, the risk of theft of an automobile still exists.

Accordingly, the inventor of the present invention has designed an automobile identification system in an effort to overcome deficiencies in terms of current techniques so as to enhance the implementation and application in industries.

SUMMARY OF THE INVENTION

In view of the aforementioned problems, the present invention aims to provide an automobile identification system to solve the problems that can be encountered in prior art.

On the basis of the aforementioned purpose, the present invention provides an automobile identification system for an automobile, including at least one first fingerprint sensor, at least one second fingerprint sensor, a database, and a processor. Each of the first fingerprint sensors is disposed on an exterior of the automobile to generate a first fingerprint image. Each of the second fingerprint sensors is disposed on an interior of the automobile to generate a second fingerprint image; the database is disposed on the interior of the automobile and is storing at least one primary reference fingerprint image. The processor is disposed on the interior of the automobile and electrically connected to the database, each of the first fingerprint sensors, and each of the second fingerprint sensors to receive the first fingerprint image, the second fingerprint image, and the primary reference fingerprint image. When the processor determines that the first fingerprint image matches the primary reference fingerprint image, the processor obtains a pass authentication and makes a door of the automobile open. When the processor determines that the second fingerprint image matches the primary reference fingerprint image, the processor obtains a use authentication and makes an engine of the automobile activate. Through a dual determination by the processor, it may be confirmed whether the person who attempts to enter the automobile is a driver without the need for a conventional key to open the door of the automobile or activate the automobile.

Preferably, when the processor determines that the first fingerprint image does not match the primary reference fingerprint image, the processor does not obtain the pass authentication and makes the door of the automobile locked.

Preferably, when the processor determines that the first fingerprint image matches the primary reference fingerprint image but the second fingerprint image does not match the primary reference fingerprint image, the processor obtains the pass authentication without obtaining the use authentication, and each of the second fingerprint sensors restarts sensing fingerprint images.

Preferably, the processor obtains user information according to the first fingerprint image or the second fingerprint image.

Preferably, the database further comprises a plurality of secondary reference fingerprint images to be provided to the processor.

Preferably, when the processor determines that the first fingerprint image matches one of the plurality of secondary reference fingerprint images, the processor obtains the pass authentication and makes the door of the automobile open; when the processor determines that the second fingerprint image matches one of the plurality of secondary reference fingerprint images, the processor obtains an authorized use authentication and makes the engine of the automobile activate.

Preferably, when the processor determines that the first fingerprint image does not match one of the plurality of secondary reference fingerprint images, the processor does not obtain the pass authentication and makes the door of the automobile locked.

Preferably, when the processor determines that the first fingerprint image matches one of the plurality of secondary reference fingerprint images but the second fingerprint image does not match one of the plurality of secondary reference fingerprint images, the processor obtains the pass authentication without obtaining the authorized use authentication, and each of the second fingerprint sensors restarts sensing fingerprint images, or the processor restarts searching for another frame of the plurality of secondary reference fingerprint images in the database.

Preferably, the automobile identification system of the present invention further includes a positioning element, wherein when the processor obtains the pass authentication and the use authentication, the positioning element positions a location and creates a map for the automobile.

Preferably, the automobile identification system of the present invention further includes a wireless transceiver, an external electronic device, and a peripheral element, wherein the wireless transceiver is disposed on the interior of the automobile, wirelessly connected to the external electronic device, and electrically connected to the processor; the peripheral element is disposed on the automobile; when the processor obtains the pass authentication and the use authentication, the external electronic device transmits a control signal to the processor through the wireless transceiver and the processor makes the peripheral element operate according to the control signal; alternatively, when the processor obtains the pass authentication and the use authentication, the processor makes the peripheral element operate.

Preferably, the peripheral element includes a driver's seat, a passenger side door, a passenger side window, rear-view mirrors, air-conditioning equipment, a dashboard, a driving recorder, a lighting device, a multimedia player, an airbag, or a car gearbox.

Preferably, each of the first fingerprint sensors and each of the second fingerprint sensors are optical fingerprint sensing and have a camera lens, and the camera lens has at least three lenses with refractive power.

Preferably, each of the camera lenses satisfies the following conditions:

$$1.0 \leq f/HEP \leq 10.0;$$

$$0 \text{ deg} \leq HAF \leq 150 \text{ deg};$$

$$0 \text{ mm} \leq PhiD \leq 18 \text{ mm};$$

$$0 \leq PhiA/PhiD \leq 0.99; \text{ and}$$

$$0.9 \leq 2(ARE/HEP) \leq 2.0;$$

wherein f is a focal length of the camera lens; HEP is an entrance pupil diameter of the camera lens; HAF is a half maximum field of view of the camera lens; PhiD is a maximum value of a minimum side length of an outer periphery of a lens base perpendicular to an optical axis of the camera lens; PhiA is a maximum effective diameter of the camera lens nearest to a lens surface of an image plane; ARE is an arc length along an outline of the lens surface, starting from an intersection point of any lens surface of any lens and the optical axis in the camera lens, and ending at a point with a vertical height which is a distance from the optical axis to half the entrance pupil diameter.

Preferably, each of the first fingerprint sensors and each of the second fingerprint sensors are capacitive or resistive fingerprinting identification sensors.

On the basis of the aforementioned purpose, the present invention provides an automobile identification system for an automobile, including at least one fingerprint sensor, a database, and a processor. Each of the fingerprint sensors is disposed on the automobile to generate a fingerprint image. The database is disposed on an interior of the automobile and storing at least one first reference image and at least one second reference image. The processor is disposed on the interior of the automobile and electrically connected to the database and each of the fingerprint sensors. When the processor determines that the fingerprint image matches the first reference image, the processor obtains a first access right and has access to an owner mode; when the processor determines that the fingerprint image matches the second reference image, the processor obtains a second access right and has access to a visitor mode. Through the determination by the processor, it may be confirmed whether the person who attempts to enter the automobile is a driver or a visitor, thus enhancing the driving safety.

Preferably, each of the fingerprint sensors respectively is a first fingerprint sensor and a second fingerprint sensor; the first fingerprint sensor is disposed on an exterior of the automobile to generate a first fingerprint image, and the second fingerprint sensor is disposed on the interior of the automobile to generate a second fingerprint image.

Preferably, when the processor determines that the first fingerprint image matches the first reference image or the second reference image, the processor obtains a pass authentication to make a door of the automobile open.

Preferably, when the processor obtains the pass authentication and determines that the second fingerprint image matches the first reference image, the processor obtains the first access right and has access to the owner mode and the processor makes the automobile travel at a high speed or at a low speed.

Preferably, the automobile identification system of the present invention further includes a positioning element; when the processor obtains the pass authentication and the first access right, the positioning element positions a location and creates a map for the automobile.

Preferably, the automobile identification system of the present invention includes a wireless transceiver, an external electronic device, and a peripheral element, wherein the wireless transceiver is disposed on the interior of the automobile, wirelessly connected to the external electronic device, and electrically connected to the processor; the peripheral element is disposed on the automobile; when the processor obtains the pass authentication and the first access right, the external electronic device transmits a control signal to the processor through the wireless transceiver and the processor makes the peripheral element operate according to the control signal; alternatively, when the processor obtains the pass authentication and the first access right, the processor makes the peripheral element operate.

Preferably, the peripheral element comprises a driver's seat, a passenger side door, a passenger side window, rear-view mirrors, air-conditioning equipment, a dashboard, a driving recorder, a lighting device, a multimedia player, an airbag, or a car gearbox.

Preferably, when the processor obtains the pass authentication and determines that the second fingerprint image matches the second reference image, the processor obtains the second access right and has access to the visitor mode and the processor makes the automobile travel at a low speed.

Preferably, the automobile identification system of the present invention further includes a positioning element; when the processor obtains the pass authentication and the second access right, the positioning element positions a location for the automobile and creates a map and the automobile is only able to travel to a plurality of restricted locations on the map.

Preferably, each of the first fingerprint sensors and each of the second fingerprint sensors are optical fingerprinting sensors and have a camera lens, and the camera lens has at least three lenses with refractive power.

Preferably, each of the camera lenses satisfies the following conditions:

$$1.0 \leq f/HEP \leq 10.0;$$

$$0 \text{ deg} \leq HAF \leq 150 \text{ deg};$$

$$0 \text{ mm} \leq PhiD \leq 18 \text{ mm};$$

$$0 PhiA/PhiD \leq 0.99; \text{ and}$$

$$0.9 \leq 2(ARE/HEP) \leq 2.0;$$

wherein f is a focal length of the camera lens; HEP is an entrance pupil diameter of the camera lens; HAF is a half maximum field of view of the camera lens; PhiD is a maximum value of a minimum side length of an outer periphery of a lens base perpendicular to an optical axis of the camera lens; PhiA is a maximum effective diameter of the camera lens nearest to a lens surface of an image plane; ARE is an arc length along an outline of the lens surface, starting from an intersection point of any lens surface of any lens and the optical axis in the camera lens, and ending at a point with a vertical height which is a distance from the optical axis to half the entrance pupil diameter.

Preferably, each of the first fingerprint sensors and each of the second fingerprint sensors are capacitive or resistive fingerprinting identification sensors.

On the basis of the aforementioned purpose, the present invention provides an automobile identification system for an automobile, including a sound sensor, a database, and a processor. The sound sensor is disposed on an exterior or interior of the automobile to obtain sound information. The database is disposed on the interior of the automobile and storing primary reference sound information. The processor is disposed on the interior of the automobile and electrically connected to the database and the sound sensor. When the processor determines that the sound information matches the primary reference sound information, the processor obtains a use authentication to make a door of the automobile door open and an engine of the automobile activated; when the processor determines that the sound information does not match the primary reference sound information, the processor makes the door of the automobile locked.

Preferably, the processor obtains user information according to the sound information.

Preferably, the database further includes a plurality of secondary reference sound information to be provided to the processor.

Preferably, when the processor determines that the sound information matches one of the plurality of secondary reference sound information, the processor obtains the authorized use authentication and makes the door of the automobile open and the engine of the automobile activated; when the processor determines that the sound information does not match one of the plurality of secondary reference sound information, the processor makes the door of the automobile locked.

Preferably, the automobile identification system of the present invention further includes a positioning element, wherein when the processor obtains the use authentication, the positioning element positions a location and creates a map for the automobile.

Preferably, the automobile identification system of the present invention further includes a wireless transceiver, an external electronic device, and a peripheral element; the wireless transceiver is disposed on the interior of the automobile, wirelessly connected to the external electronic device, and electrically connected to the processor; the peripheral element is disposed on the automobile; when the processor obtains the use authentication, the external electronic device transmits a control signal to the processor through the wireless transceiver and the processor makes the peripheral element operate according to the control signal; alternatively, when the processor obtains and the use authentication, the processor makes the peripheral element operate.

Preferably, the peripheral element comprises a driver's seat, a passenger side door, a passenger side window, rear-view mirrors, air-conditioning equipment, a dashboard, a driving recorder, a lighting device, a multimedia player, an airbag, or a car gearbox.

One advantage of the aforementioned embodiment is that the automobile identification system of the present invention utilizes the fingerprint sensor to obtain a fingerprint image; together with the determination by the processor, it may be confirmed whether the person who attempts to enter the automobile is a driver without the need for a conventional key to open the door of the automobile or activate the automobile.

The other advantage of the aforementioned embodiment is that the automobile identification system of the present invention utilizes the sound sensor to obtain sound information; together with the determination by the processor, it may be confirmed whether the person who attempts to enter the automobile is a driver without the need for a conventional key to open the door of the automobile or activate the automobile.

DESCRIPTION OF THE PREFERRED EMBODIMENTS

Figure 1:
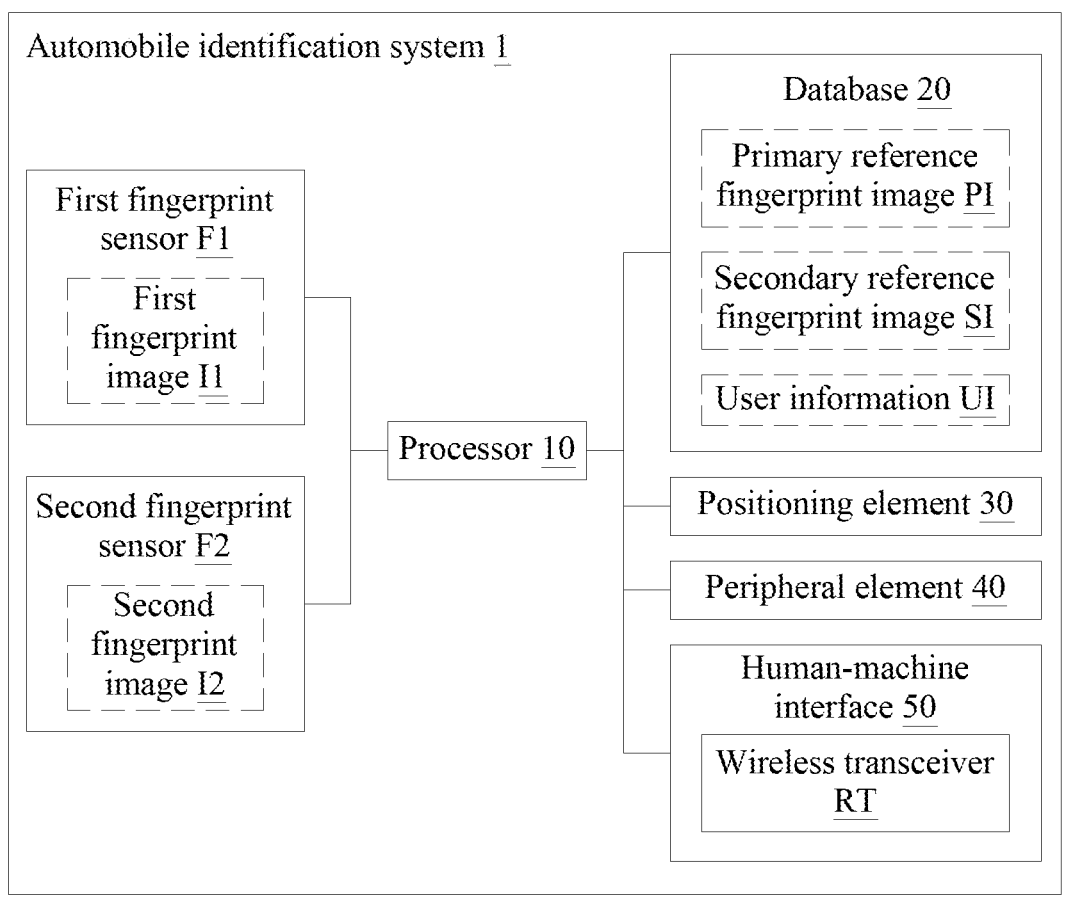
FIG. 1 depicts a block diagram of the automobile identification system according to the first embodiment of the present invention.

The advantages, features, and technical methods of the present invention are to be explained in detail with reference to the exemplary embodiments and the figures for the purpose of being more easily to be understood. Moreover, the present invention may be realized in different forms, and should not be construed as being limited to the embodiments set forth herein. Conversely, for a person of ordinary skill in the art, the embodiments provided shall make the present invention convey the scope more thoroughly, comprehensively, and completely. In addition, the present invention shall be defined only by the appended claims.

It should be noted that although the terms "first," "second," and the like may be used in the present invention to describe various elements, components, regions, layers and/or portions, these elements, components, regions, layers and/or portions should be limited by these terms. These terms are only used to distinguish one element, component, region, layer, and/or portion from another element, component, region, layer, and/or portion. Hence, the "first element", "first component", "first region", "first layer" and/or "first portion" discussed hereafter may be referred to as "second component", "second region", "second layer" and/or "second portion" without departing from the teachings of the present invention.

In addition, the terms "include" and/or "contain" are used to indicate the presence of features, regions, entirety, steps, operations, elements and/or components, but may not exclude the presence or addition of one or more of other features, regions, entirety, steps, operations, and/or combinations thereof.

Unless otherwise defined, all terms (including technical and scientific terms) used in the present invention have the same meaning as those commonly understood by a person of ordinary skill in the art. It should be further understood that, unless explicitly defined herein, the terms such as those defined in commonly used dictionaries should be interpreted as having definitions consistent with their meaning in the context of the related art and the present invention, and should not be construed as idealized or overly formal.

Please refer to FIG. 1 to FIG. 4, which respectively depict a block diagram of the automobile identification system according to the first embodiment of the present invention, configuration diagrams of the first fingerprint sensor of the automobile identification system according to the first embodiment of the present invention, and a configuration diagram of the second fingerprint sensor of the automobile identification system of the present invention. As shown in FIG. 1 to FIG. 4, the automobile identification system of the present invention may be applied to an automobile C, including at least one first fingerprint sensor F1, at least one second fingerprint sensor F2, a database 20, and a processor 10. Each of the first fingerprint sensors F1 is disposed on an exterior of the automobile C to generate a first fingerprint image I1. Each of the second fingerprint sensors F2 is disposed on an interior of the automobile C to generate a second fingerprint image I2. The database 20 is disposed on the interior of the automobile C and is storing at least one primary reference fingerprint image PI. The processor 10 is disposed on the interior of the automobile C and electrically connected to the database 20, each of the first fingerprint sensors F1, and each of the second fingerprint sensors F2 to receive the first fingerprint image I1, the second fingerprint image I2, and the primary reference fingerprint image PI. When the processor 10 determines that the first fingerprint image I1 matches the primary reference fingerprint image PI, the processor 10 obtains a pass authentication and makes a door of the automobile C open. When the processor 10 determines that the second fingerprint image I2 matches the primary reference fingerprint image PI, the processor 10 obtains a use authentication and makes an engine of the automobile C activate. Through a dual determination by the processor 10, it may be confirmed whether the person who attempts to enter the automobile C is a driver without the need for a conventional key to open the door of the automobile C or activate the automobile C.

It should be noted that the exterior and interior of the automobile C are distinguished based on the door; that is, the side of the door close to the external environment is the exterior of the automobile C, and the side of the door close to the seat is the interior of the automobile C. The above is for illustrative purposes only and is not intended to limit the scope of the present invention.

Figure 2:
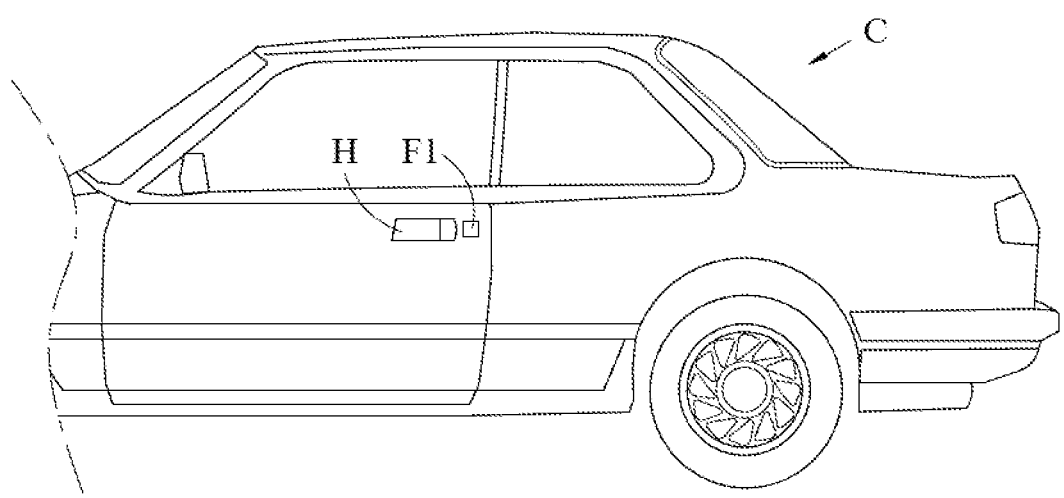
FIG. 2 and FIG. 3 depict configuration diagrams of the first fingerprint sensor of the automobile identification system according to the first embodiment of the present invention.
Figure 3:
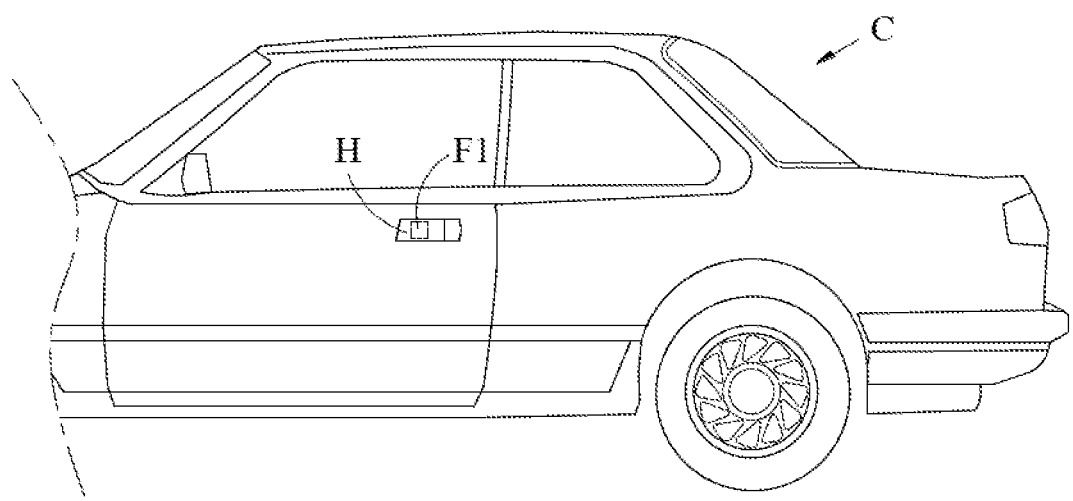
Figure 4:
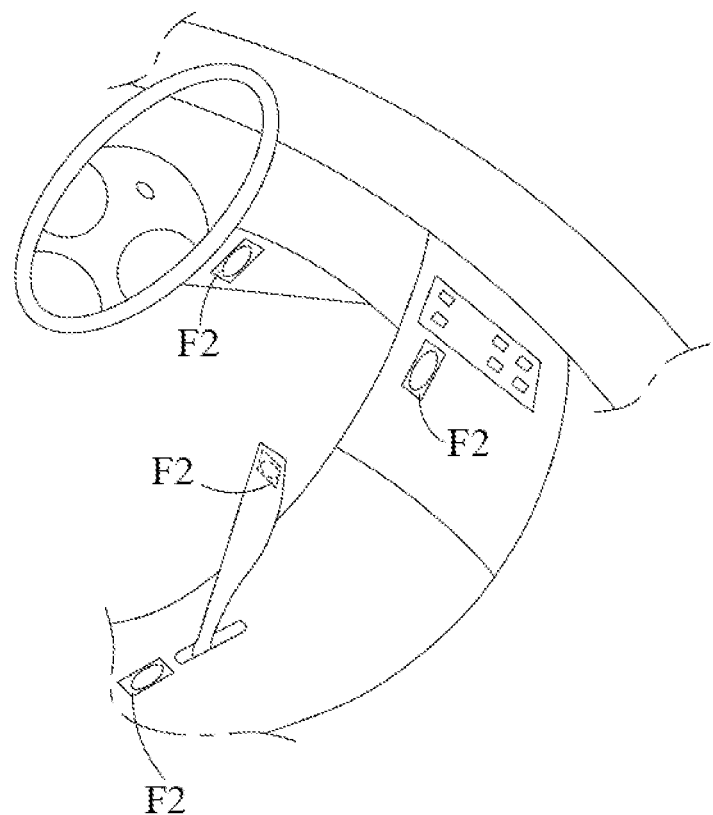
FIG. 4 depicts a configuration diagram of the second fingerprint sensor of the automobile identification system of the present invention.

In one embodiment, the first fingerprint sensor F1 may be disposed on the door of the automobile as shown in FIG. 2; in another embodiment, the first fingerprint sensor F1 may be disposed on the handle H of the door of the automobile as shown in FIG. 3. The first fingerprint sensor F1 may also be other preferable positions, and is only disposed on the exterior of the automobile C, but is not limited to the scope of the present invention. In addition, the plurality of second fingerprint sensors F2 may be respectively disposed near the steering wheel, the control lever, and the multimedia player as shown in FIG. 4; it is also possible to have other preferable positions and is not limited to the scope of the present invention.

In one embodiment, each of the first fingerprint sensors F1 and each of the second fingerprint sensors F2 may be optically fingerprinting identifying and have a camera lens; In another embodiment, each of the first fingerprint sensors F1 and each of the second fingerprint sensors F2 may be capacitive or resistive fingerprinting identifying. It is also possible to use the first fingerprint sensor F1 and second fingerprint sensor F2 with the functions of optically fingerprinting identifying and capacitive fingerprinting identifying according to actual requirements without being limited to the scope of the present invention.

In some embodiments, the processor 10 may determine whether the first fingerprint image I1 matches the reference fingerprint image PI according to the end point of the fingerprint of the reference fingerprint image PI; in some embodiments, the processor 10 may determine whether the first fingerprint image I1 matches the reference fingerprint image PI according to the bifurcation point of the fingerprint of the reference fingerprint image PI; in some embodiments, the processor 10 may determine whether the first fingerprint image I1 matches the reference fingerprint image PI according to the texture and pattern of the fingerprint of the reference fingerprint image PI. It may also referred to other fingerprint features in the reference fingerprint image PI as a basis for the determination, and is not limited to the scope of the present invention.

Herein, the operational mechanism of the processor 10, each of the first fingerprint sensors F1, and each of the second fingerprint sensors F2 is described in detail as follows: (1) When the processor 10 determines that the first fingerprint image I1 does not match the primary reference fingerprint image PI, the processor 10 does not obtain the pass authentication and makes the door of the automobile C locked, refusing the person who attempts to enter the automobile C. (2) When the processor 10 determines that the first fingerprint image I1 matches the primary reference fingerprint image PI but the second fingerprint image I2 does not match the primary reference fingerprint image PI, the processor 10 obtains the pass authentication without obtaining the use authentication. Each of the second fingerprint sensors F2 may not sense the person who has entered the automobile C. Therefore, the person who has entered the automobile C places the finger on the second fingerprint sensor F2 again, and the second fingerprint sensor restarts sensing fingerprint images. (3) When the processor 10 determines that the first fingerprint image I1 matches the primary reference fingerprint image PI and the second fingerprint image I2 matches the primary reference fingerprint image PI, the processor 10 obtains the pass authentication and the use authentication, that is, confirming that the person who attempts to enter the automobile C is the driver.

In addition, the automobile identification system of the present invention further includes a positioning element 30, a peripheral element 40, a human-machine interface 50 having a wireless transceiver RT, and an external electronic device. The positioning element 30, the peripheral element 40, the human-machine interface 50 having a wireless transceiver RT are all disposed on the interior of the automobile C and electrically connected to the processor 10; the external electronic device is wirelessly connected to the wireless transceiver RT; Wherein, wireless connections include the Internet, Wi-Fi, WiMax (Worldwide Interoperability for Microwave Access), ZigBee, Bluetooth, NB-IoT (Narrow Band IoT), or LoRa (Long Range). It may be possible to have other wireless connections and is not limited to the scope of the present invention.

Specifically, when the processor 10 determines that the first fingerprint image I1 matches the primary reference fingerprint image PI and the second fingerprint image I2 matches the primary reference fingerprint image PI, the processor 10 obtains the pass authentication and the use authentication, that is, confirming that the person who attempts to enter the automobile C is the driver. After obtaining the pass authentication and the use authentication, the processor 10 sends a start signal to make the positioning element 30 operate; the positioning element 30 performs positioning for the automobile C and establishes a map according to the surrounding environment of automobile C; the positioning element 30 may also acquire the information on the weather and temperature of the place where the automobile C is located, and the driver may better understand the environment and traffic; the driver controls the operation of the peripheral element 40 through the human-machine interface 50. Alternatively, the driver may send a control signal to the wireless transceiver RT through an external electronic device, thus transmitting a control signal to the processor 10; the processor 10 controls the operation of the peripheral element 40 according to the control signal. Meanwhile, the processor 10 records the setting of the peripheral element 40 which is then stored as the user information UI of the database 20; when the driver is sensed by the first fingerprint sensor F1 and the second fingerprint sensor F2 again, the processor 10 may extract the user information UI from the database 20 according to the first fingerprint image I1 and the second fingerprint image I2; then, the processor 10 displays the user information UI on the human-machine interface 50.

Wherein, the user information UI may include the height, age, and travel location of the driver; the external electronic device may be a mobile phone or a tablet, and may also be other electronic elements that may be wirelessly connected to the wireless transceiver RT, which is not limited to the scope of the present invention. The peripheral element 40 includes a driver's seat, a passenger side door, a passenger side window, rear-view mirrors, air-conditioning equipment, a dashboard, a driving recorder, a lighting device, a multimedia player, an airbag, or a car gearbox as long as it may be controlled by the processor 10 as the peripheral element 40 without being limited to the scope of the present invention.

In addition, the database 20 further includes a plurality of secondary reference fingerprint images SI to be provided to the processor 10. The plurality of secondary reference fingerprint images SI are fingerprint images of other users authorized by the driver to use the automobile C. Herein, the operational mechanism of the processor 10, the secondary reference fingerprint image SI, each of the first fingerprint sensors F1, and each of the second fingerprint sensors F2 is described in detail as follows: (1) When the processor 10 determines that the first fingerprint image I1 does not match one of the plurality of secondary reference fingerprint images SI, the processor 10 does not obtain the pass authentication and makes the door of the automobile C locked, meaning that the person who attempts to enter the automobile C is not the user authorized by the driver to use the automobile C. (2) When the processor 10 determines that the first fingerprint image I1 matches one of the plurality of secondary reference fingerprint images SI but the second fingerprint image I2 does not match one of the plurality of secondary reference fingerprint images SI, the processor 10 obtains the pass authentication without obtaining the authorized use authentication and each of the second fingerprint sensor F2 may not sense the person who has entered the automobile C. Therefore, the person who has entered the automobile C has placed his finger on the second fingerprint sensor F2 again; alternatively, the processor 10 does not immediately find the secondary reference fingerprint image SI that matches the person who attempts to enter the automobile C, so the processor 10 restarts searching for another frame of the plurality of secondary reference fingerprint images SI in the database 20. (3) when the processor 10 determines that the first fingerprint image I1 and the second fingerprint image I2 both match one of the plurality of secondary reference fingerprint images SI, the processor 10 obtains the pass authentication and the use authentication, confirming that the person who attempts to enter the automobile C is the person authorized by the driver to use the automobile C; the processor 10 opens the door of the automobile C and activates the engine of the automobile C.

Similarly, when the processor 10 determines that the first fingerprint image I1 and the second fingerprint image I2 both match one of the plurality of secondary reference fingerprint images SI, the processor 10 obtains the pass authentication and the use authentication, confirming that the person who attempts to enter the automobile C is the user authorized by the driver to use the automobile C; after obtaining the pass authentication and the use authentication, the processor 10 sends a start signal to make the positioning element 30 operate; the positioning element 30 performs positioning for the automobile C and establishes a map according to the surrounding environment of automobile C; the positioning element 30 may also acquire the information on the weather and temperature of the place where the automobile C is located, and the user may better understand the environment and traffic; the user controls the operation of the peripheral element 40 through the human-machine interface 50; alternatively, the user may send a control signal to the wireless transceiver RT through an external electronic device, thus transmitting a control signal to the processor 10; the processor 10 controls the operation of the peripheral element 40 according to the control signal. Meanwhile, the processor 10 records the setting of the peripheral element 40 which is then stored as the user information UI of the database 20; when the user is sensed by the first fingerprint sensor F1 and the second fingerprint sensor F2 again, the processor 10 may extract the user information UI from the database 20 according to the first fingerprint image I1 and the second fingerprint image I2; then, the processor 10 displays the user information UI on the human-machine interface 50.

Figure 5:
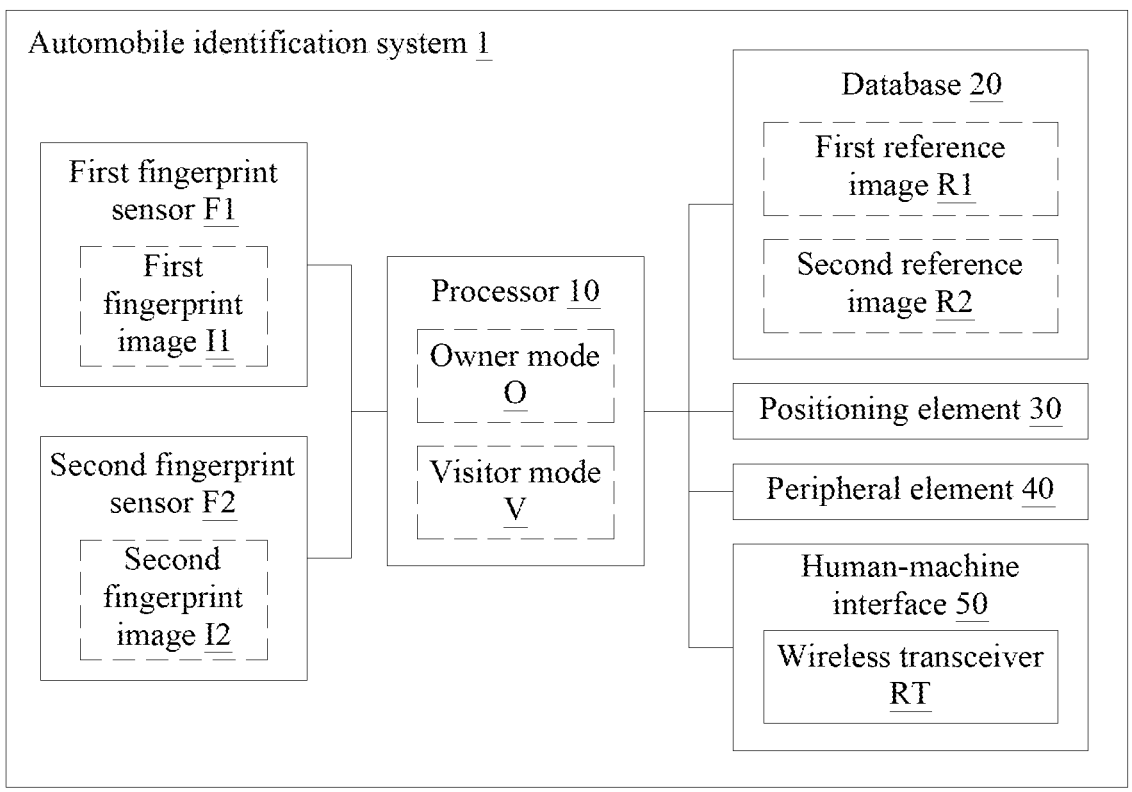
FIG. 5 depicts a block diagram of the automobile identification system according to the second embodiment of the present invention.

Please refer to FIG. 5 which depicts a block diagram of the automobile identification system according to the second embodiment of the present invention. As shown in FIG. 5, the main difference between the second embodiment and the first embodiment lies in the fact that the processor 10 has an owner mode O and a visitor mode V and the database 20 stores at least one frame of the first reference image R1 and at least one frame of the second reference image R2; the configuration of the rest of the elements are the same as that of the first embodiment, and thus the description of the configuration of the same elements shall be omitted herein.

Herein, the operational mechanism of the processor 10, the first reference image R1, the second reference image R2, each of the first fingerprint sensors F1, and each of the second fingerprint sensors F2 is described in detail as follows: (1) When the processor 10 determines that the first fingerprint image I1 does not match the first reference image R1 or the second reference image R2, the processor 10 does not obtain the pass authentication and makes the door of the automobile C locked, refusing the person who attempts to enter the automobile C; when the processor 10 determines that the first fingerprint image I1 matches the first reference image R1 or the second reference image R2, the processor 10 obtains the pass authentication and opens the door of the automobile C. (2) when the processor 10 obtains the pass authentication but determines that the second fingerprint image I2 does not match the first reference image R1 or the second reference image R2, the processor 10 obtains the pass authentication without obtaining the first access right and the second access right. Each of the second fingerprint sensors F2 may not sense the person who has entered the automobile C. Therefore, the person who has entered the automobile C places the finger on the second fingerprint sensor F2 again. (3) When the processor 10 obtains the pass authentication and determines that the second fingerprint image I2 matches the first reference image R1, the processor 10 obtains the first access right and has access to the owner mode O and the processor 10 makes the automobile C travel at a high speed or at a low speed. (3) When the processor 10 obtains the pass authentication and determines that the second fingerprint image I2 matches the second reference image R2, the processor 10 obtains the second access right and has access to the visitor mode V and the processor 10 makes the automobile C travel at a low speed.

It should be noted that the user of the first access right is a driver or a user authorized by the driver who may use the human-machine interface 50 to perform various operations on the automobile, for instance, controlling the position of the seat in the car, controlling the temperature and wind direction of the air-conditioning equipment, accessing the video recorded by the driving recorder, playing the preset radio station, automatically adjusting the rear-view mirror, and the like; the user of the second access right may be a younger user, such as a college student, who has to manually activate the automobile C and operate the peripheral elements 40. It is also possible to add access rights according to the using condition and is not limited to the scope of the present invention.

When the processor 10 determines that the first fingerprint image I1 and the second fingerprint image I2 match the first reference image R1, the processor 10 obtains the pass authentication and the first access right and enters the owner mode O, confirming that the person who attempts to enter the automobile C is the driver or the user authorized by the driver to use the automobile C; the processor 10 enables the automobile C to travel at a high speed or at a low speed; the positioning element 30 performs positioning for the automobile C and establishes a map according to the surrounding environment of automobile C; the positioning element 30 may also acquire the information on the weather and temperature of the place where the automobile C is located, and the driver may better understand the environment and traffic; the driver controls the operation of the peripheral element 40 through the human-machine interface 50. Alternatively, the driver may send a control signal to the wireless transceiver RT through an external electronic device, thus transmitting a control signal to the processor 10; the processor 10 controls the operation of the peripheral element 40 according to the control signal. Meanwhile, the processor 10 records the setting of the peripheral element 40 which is then stored in the database 20; when the driver is sensed by the first fingerprint sensor F1 and the second fingerprint sensor F2 again, the processor 10 may extract the setting of the peripheral elements 40 stored in the database 20 according to the first fingerprint image I1 and the second fingerprint image I2; then, the processor 10 displays the user information UI on the human-machine interface 50.

In addition, when the processor 10 obtains the pass authentication and the first access right and enters the owner mode O, it may be confirm that the person who attempts to enter the automobile C is the driver or the user authorized by the driver to use the automobile C. In one embodiment, the human-machine interface 50 allows the seat position or the tilted angle of the seat back match the height or the driving habit of the driver or the user authorized by the driver. Alternatively, the driver or the user authorized by the driver may adjust the passenger side window and lock/unlock the passenger side door through the use of the human-machine interface 50. In one embodiment, the human-machine interface 50 may automatically adjust the wireless broadcast to the frequency with which the driver or the user authorized by the driver prefers to listen. Alternatively, the human-machine interface 50 makes the wireless transceiver RT automatically connected to the mobile phone of the driver or the user authorized by the driver.

In one embodiment, the human-machine interface 50 may adjust the GPS of the positioning element 30 to load the locations where the driver or the user authorized by the driver frequently arrives or the destination coordinates preset by the user in the GPS. In one embodiment, the human-machine interface 50 may adjust the rear-view mirror to match the optimal monitoring angle or the driving habits of the driver or the user authorized by the driver. Alternatively, the human-machine interface 50 may adjust the display mode or display information of the dashboard, and adjust the recording time of the driving recorder or turn on/off the driving recorder. In one embodiment, the human-machine interface 50 may be prepared for the activation of the airbag; alternatively, the man-machine interface 50 may adjust the car gearbox to match the preferences of the driver or the user authorized by the driver to the different requirements for the driving wheel traction force and driving speed under the different driving conditions such as initiating, accelerating, and overcoming various road obstacles.

In one embodiment, the human-machine interface 50 may adjust the air-conditioning equipment such that the temperature and humidity of the environment in the automobile C match the preferences of the driver or the user authorized by the driver. In one embodiment, the human-machine interface 50 may adjust the lighting device so that the brightness and color temperature of the environment in the automobile C match the preferences of the driver or the user authorized by the driver. Alternatively, the human-machine interface 50 may adjust the multimedia player to load a playlist or play mode that matches the preferences of the driver or the user authorized by the driver in the multimedia player.

The operation of the peripheral elements 40 of the automobile C and the activation of the automobile C in the aforementioned paragraphs are merely illustrated as examples. It is also possible to adjust the operation of the other elements of the automobile C according to the requirements of the driver or the user authorized by the driver and is not limited to the scope of the present invention.

When the processor 10 determines that the first fingerprint image I1 and the second fingerprint image I2 match the second reference image R2, the processor 10 obtains the pass authentication and the second access right and enters the visitor mode V, confirming that the person who attempts to enter the automobile C is a younger user. The processor 10 enables the automobile C to travel at a low speed; the positioning element 30 performs positioning for the automobile C and establishes a map according to the surrounding environment of automobile C, and the positioning element 30 may also acquire the information on the weather and temperature of the place where the automobile C is located. Since the processor 10 obtains the second access right, the younger user may only drive the automobile C to a plurality of restricted locations on the map, and The activation of the peripheral elements 40 needs to be performed manually.

It should be noted that the access right may be further added according to the using condition. Accordingly, the reference image of the database may also be expended according to the using condition, and is not limited to the scope of the present invention.

In some embodiments, the camera lens includes three lenses with refractive power, which are a first lens, a second lens, and a third lens sequentially arranged from an object side to an image side, and the camera lens satisfies the following condition: $0.1 \leq InTL/HOS \leq 0.95$; wherein, HOS is a distance from an object side surface of the first lens to the image plane on an optical axis; InTL is a distance from an object side surface of the first lens to an image side surface of the third lens on an optical axis.

In some embodiments, the camera lens includes four lenses with refractive power, which are a first lens, a second lens, a third lens, and a fourth lens, sequentially arranged from an object side to an image side, and the camera lens satisfies the following condition: $0.1 \leq InTL/HOS \leq 0.95$; wherein, HOS is a distance from an object side surface of the first lens to the image plane on an optical axis; InTL is a distance from an object side surface of the first lens to an image side surface of the fourth lens on an optical axis.

In some embodiments, the camera lens includes five lenses with refractive power, which are a first lens, a second lens, a third lens, a fourth lens, and a fifth lens sequentially arranged from an object side to an image side, and the camera lens satisfies the following condition: $0.1 \leq InTL/HOS \leq 0.95$; wherein, HOS is a distance from an object side surface of the first lens to the image plane on an optical axis; InTL is a distance from an object side surface of the first lens to an image side surface of the fifth lens on an optical axis.

In addition to the structural embodiment as mentioned above, an optical embodiment related to the camera lens is to be described as follows. The automobile identification system of the present invention may be designed using three operational wavelengths, namely 486.1 nm, 587.5 nm, and 656.2 nm. Wherein, 587.5 nm is the main reference wavelength for the technical features. The automobile identification system of the present invention may be designed using five operational wavelengths, namely 470 nm, 510 nm, 555 nm, 610 nm, 650 nm. Wherein, 555 nm is the main reference wavelength for the technical features.

PPR is the ratio of the focal length f of the camera lens to a focal length fp of each of lenses with positive refractive power. NPR is the ratio of the focal length f of the camera lens to the focal length fn of each of lenses with negative refractive power. The sum of the PPR of all the lenses with positive refractive power is ΣPPR. The sum of the NPR of all the lenses with negative refractive power is ΣNPR. Controlling the total refractive power and total length of the camera lens may be achieved when the following conditions are satisfied: $0.5 \leq \Sigma PPR/|\Sigma NPR| \leq 15$. Preferably, the following conditions may be satisfied: $1 \leq \Sigma PPR/|\Sigma NPR| \leq 3.0$.

In addition, HOI is defined as half a diagonal of a sensing field of the optical image sensor S (i.e., the imaging height or the maximum imaging height of the optical image sensor S). HOS is a distance on the optical axis from an object side of the first lens to the image plane, which satisfies the following conditions: $HOS/HOI \leq 50$; and $0.5 \leq HOS/f \leq 150$. Preferably, the following conditions are satisfied: $1 \leq HOS/HOI \leq 40$; $1 \leq HOS/f \leq 140$. Therefore, the automobile identification system may be maintained in miniaturization so that the module may be equipped on thin and portable electronic products.

In addition, in an embodiment, at least one aperture may be disposed in the camera lens of the present invention to reduce stray light and enhance image quality.

Specifically, the disposition of the aperture may be a front aperture or a middle aperture in the camera lens of the present invention. Wherein, the front aperture is the aperture disposed between the shot object and the first lens. The front aperture is the aperture disposed between the first lens and the image plane. If the aperture is the front aperture, a longer distance may be created between the exit pupil and the image plane in the camera lens so that more optical elements may be accommodated and the efficiency of optical image sensor S receiving images may be increased. If the aperture is the middle aperture, the field of view of the system may be expended in such a way that the camera lens has the advantages of a wide-angle lens. InS is defined as the distance from the aforementioned aperture to the image plane, which satisfies the following condition: $0.1 \leq InS/HOS \leq 1.1$. Therefore, the features of the camera lens maintained in miniaturization and having wide-angle may be attended simultaneously.

In the camera lens of the present invention, the camera lens including 6 lenses with refractive power is presented as an example. InTL is a distance on the optical axis from an object side of the first lens to an image side surface of the sixth lens. ΣTP is the sum of the thicknesses of all the lenses with refractive power on the optical axis. The following conditions are satisfied: $0.1 \Sigma TP/InTL \leq 0.9$. Therefore, the contrast ratio of system imaging and the yield rate of lens manufacturing may be attended simultaneously. Moreover, an appropriate back focal length is provided to accommodate other elements.

R1 is the curvature radius of the object side surface of the first lens. R2 is the curvature radius of the image side surface of the first lens. The following condition is satisfied: $0.001 \leq |R1/R2| \leq 25$. Therefore, the first lens is equipped with appropriate intensity of positive refractive power to prevent the spherical aberration from increasing too fast. Preferably, the following condition is satisfied: $0.01 \leq R1/R2| < 12$.

R11 is the curvature radius of the object side surface of the sixth lens. R12 is the curvature radius of the image side surface of the sixth lens. This following condition is satisfied: $-7 < (R11-R12)/(R11+R12) < 50$. Therefore, it is advantageous to correct the astigmatism generated by the camera lens.

IN12 is the distance between the first lens and the second lens on the optical axis. The following condition is satisfied: $IN12/\leq f \leq 60$. Therefore, it is beneficial to improve the chromatic aberration of the lenses so as to enhance the performance.

IN56 is the distance between the fifth lens and the sixth lens on the optical axis. The following condition is satisfied: $IN56/f \leq 3.0$. Therefore, it is beneficial to improve the chromatic aberration of the lens so as to enhance the performance.

TP1 and TP2 are respectively the thicknesses of the first lens and the second lens on the optical axis. The following condition is satisfied: $0.1 \leq (TP1+IN12)/TP2 \leq 10$. Therefore, it is beneficial to control the sensitivity produced by the camera lens so as to enhance the performance.

TP5 and TP6 are respectively the thicknesses of the fifth lens and the sixth lens on the optical axis. The following condition is satisfied: $0.1 \leq (TP6+IN56)/TP5 \leq 15$. Therefore, it is beneficial to control the sensitivity produced by the camera lens so as to enhance the performance.

TP2, TP3, and TP4 are respectively the thicknesses of the second lens, the third lens, and the fourth lens on the optical axis. IN23 is the distance between the second lens and the third lens on the optical axis. IN45 is the distance between the third lens and the fourth lens on the optical axis. InTL is the distance from an object side surface of the first lens to an image side surface of the sixth lens. The following condition is satisfied: $0.1 \leq TP4/(IN34+TP4+IN45) < 1$. Therefore, it is beneficial to slightly correct the aberration generated by the incident light advancing in the process layer upon layer so as to decrease the overall height of the system.

In the camera lens, HVT61 is the distance perpendicular to the optical axis between a critical point C61 on an object side surface of the sixth lens and the optical axis. HVT62 is the distance perpendicular to the optical axis between a critical point C62 on an image side surface of the sixth lens and the optical axis. SGC61 is a distance parallel to the optical axis from an axial point on the object side surface of the sixth lens to the critical point C61. SGC62 is the distance parallel to the optical axis from an axial point on the image side surface of the sixth lens to the critical point C62. The following conditions may be satisfied: $0 \text{ mm} \leq HVT61 \leq 3 \text{ mm1e camera len} \leq 6 \text{ mm}$; $0 \leq HVT61/HVT62$; $0 \text{ mm} \leq |SGC61| \leq 0.5 \text{ mm}$; $0 \text{ mm} < |SGC62| \leq 2 \text{ mm}$; and $0 < |SGC62|/(|SGC62|+TP6) \leq 0.9$. Therefore, it may be effective to correct the aberration of the off-axis view field.

The camera lens of the present invention satisfies the following condition: $0.2 \leq HVT62/HOI \leq 0.9$. Preferably, the following condition may be satisfied: $0.3 \leq HVT62/HOI \leq 0.8$. Therefore, it is beneficial to correct the aberration of the surrounding view field of the camera lens.

The camera lens of the present invention satisfies the following condition: $0 \leq HVT62/HOS \leq 0.5$. Preferably, the following condition may be satisfied: $0.2 \leq HVT62/HOS \leq 0.45$. Hereby, it is beneficial to correct the aberration of the surrounding view field of the camera lens.

In the camera lens of the present invention, SGI611 denotes a distance parallel to an optical axis from an inflection point on the object side surface of the sixth lens which is nearest to the optical axis to an axial point on the object side surface of the sixth lens. SGI621 denotes a distance parallel to an optical axis from an inflection point on the image side surface of the sixth lens which is nearest to the optical axis to an axial point on the image side surface of the sixth lens. The following condition are satisfied: $0 < SGI611/(SGI611+TP6) \leq 0.9$; $0 < SGI621/(SGI621+TP6) \leq 0.9$. Preferably, the following conditions may be satisfied: $0.1 \leq SGI611/(SGI611+TP6) \leq 0.6$; $0.1 \leq SGI621/(SGI621+TP6) \leq 0.6$.

SGI612 denotes a distance parallel to the optical axis from the inflection point on the object side surface of the sixth lens which is the second nearest to the optical axis to an axial point on the object side surface of the sixth lens. SGI622 denotes a distance parallel to an optical axis from an inflection point on the image side surface of the sixth lens which is the second nearest to the optical axis to an axial point on the image side surface of the sixth lens. The following conditions are satisfied: $0 < SGI612/(SGI612+TP6) \leq 0.0$; $0 < SGI622/(SGI622+TP6) \leq 0.9$. Preferably, the following conditions may be satisfied: $0.1 \leq SGI612/(SGI612+TP6) \leq 0.6$; $0.1 \leq SGI622/(SGI622+TP6) \leq 0.6$.

HIF611 denotes the distance perpendicular to the optical axis between the inflection point on the object side surface of the sixth lens which is the nearest to the optical axis and the optical axis. HIF621 denotes the distance perpendicular to the optical axis between an axial point on the image side surface of the sixth lens 16 and an inflection point on the image side surface of the sixth lens which is the nearest to the optical axis. The following conditions are satisfied: $0.001 \text{ mm} \leq |HIF611| \leq 5 \text{ mm}$; $0.001 \text{ mm} \leq |HIF621| \leq 5 \text{ mm}$. Preferably, the following conditions may be satisfied: $0.1 \text{ mm} \leq |HIF611| \leq 3.5 \text{ mm}$; $1.5 \text{ mm} \leq |HIF621| \leq 3.5 \text{ mm}$.

HIF612 denotes the distance perpendicular to the optical axis between the inflection point on the object side surface of the sixth lens which is the second nearest to the optical axis and the optical axis. HIF622 denotes the distance perpendicular to the optical axis between an axial point on the image side surface of the sixth lens and an inflection point on the image side surface of the sixth lens which is the second nearest to the optical axis. The following conditions are satisfied: $0.001 \text{ mm} > |HIF612| \leq 5 \text{ mm}$; $0.001 \text{ mm} \leq |HIF622| \leq 5 \text{ mm}$. Preferably, the following conditions may be satisfied: $0.1 \text{ mm} \leq |HIF622| \leq 3.5 \text{ mm}$; $0.1 \text{ mm} \leq |HIF612| \leq 3.5 \text{ mm}$.

HIF613 denotes the distance perpendicular to the optical axis between the inflection point on the object side surface of the sixth lens which is the third nearest to the optical axis and the optical axis. HIF623 denotes the distance perpendicular to the optical axis between an axial point on the image side surface of the sixth lens and an inflection point on the image side surface of the sixth lens which is the third nearest to the optical axis. The following conditions are satisfied: $0.001 \text{ mm} \leq |HIF613| \leq \text{mm}$; $0.001 \text{ mm} \leq |HIF623| \leq 5 \text{ mm}$. Preferably, the following conditions may be satisfied: $0.1 \text{ mm} \leq |HIF623| \leq 3.5 \text{ mm}$; $0.1 \text{ mm} \leq |HIF613| \leq 3.5 \text{ mm}$.

HIF614 denotes the distance perpendicular to the optical axis between the inflection point on the object side surface of the sixth lens which is the fourth nearest to the optical axis and the optical axis. HIF624 denotes the distance perpendicular to the optical axis between an axial point on the image side surface of the sixth lens and an inflection point on the image side surface of the sixth lens which is the fourth nearest to the optical axis. The following conditions are satisfied: 0.001 mm≤|HIF614|≤5 mm; 0.001 mm≤|HIF624|≤5 mm. Preferably, the following relations may be satisfied: 0.1 mm≤|HIF624|3.5 mm and 0.1 mm≤|HIF614|≤3.5 mm.

In the camera lens of the present invention, (TH1+TH2)/HOI satisfies the following condition: 0<(TH1+TH2)/HOI≤0.95, or 0<(TH1+TH2)/HOI≤0.5 preferably. (TH1+TH2)/HOS satisfies the following condition: 0 <(TH1+TH2)/HOS≤0.95, or 0<(TH1+TH2)/HOS≤0.5 preferably. 2*(TH1+TH2)/PhiA satisfies the following condition: 0<2*(TH1+TH2)/PhiA≤0.95, or 0<2*(TH1+TH2)/PhiA≤0.5 preferably.

In an embodiment of the camera lens in the present invention, interchangeably arranging the lenses with a high dispersion coefficient and a low dispersion coefficient is beneficial to correcting the chromatic aberration of camera lens.

The equation for the aspheric surface as mentioned above is:

$$z=ch2/[1+[1(k+1)c2h2]0.5]+A4h4+A6h6+A8h8+A10h10+A12h12+A14h14+A16h16+A18h18+A20h20+ \quad (1)$$

Wherein, z is a position value of the position along the optical axis at the height h where the surface apex is regarded as a reference; k is the conic coefficient; c is the reciprocal of curvature radius; and A4, A6, A8, A10, A12, A14, A16, A18, and A20 are high order aspheric coefficients.

In the camera lens of the present invention, the material of the lens may be made of glass or plastic. Using plastic as the material for producing the lens may effectively reduce the cost of manufacturing. In addition, using glass as the material for producing the lens may control the heat effect and increase the designed space configured by the refractive power of the camera lens. Moreover, the object side surface and the image side surface from the first lens 11 to the sixth lens 17 may be aspheric, which may obtain more control variables. Apart from eliminating the aberration, the number of lenses used may be reduced compared with that of traditional lenses used made by glass. Thus, the total height of the camera lens may be reduced effectively.

Furthermore, in the camera lens of the present invention, when the surface of the lens is a convex surface, the surface of the lens adjacent to the optical axis is convex in principle. When the surface of the lens is a concave surface, the surface of the lens adjacent to the optical axis is concave in principle.

In the camera lens of the present invention, at least one of the first lens, the second lens, the third lens, the fourth lens, the fifth lens, and sixth lens may further be designed as a light filtration element with a wavelength of less than 500 nm depending on requirements. The light filtration element may be realized by coating at least one surface of the specific lens with the filter function, or may be realized by the lens itself having the material capable of filtering short wavelength.

The image plane of the camera lens of the present invention may be a plane or a curved surface depending requirements. When the image plane is a curved surface such as a spherical surface with a curvature radius, the incident angle necessary for focusing light on the image plane may be reduced. Hence, it not only contributes to shortening the length (TTL) of the camera lens, but also promotes the relative illuminance.

The first optical embodiment

Figure 6:
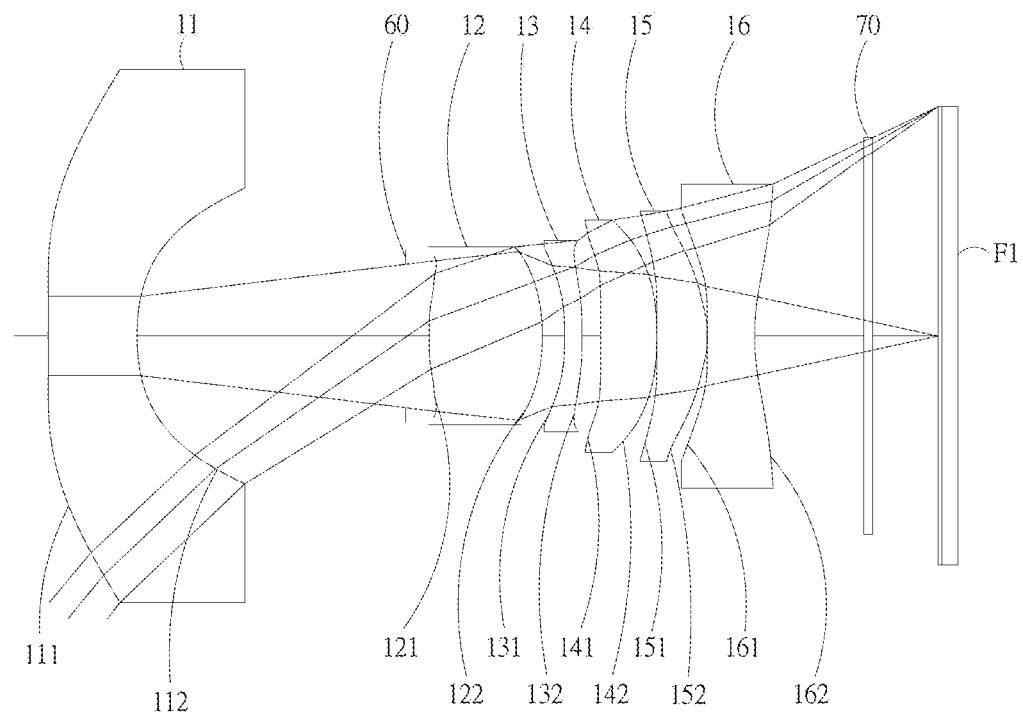
FIG. 6 depicts a configuration diagram of the camera lens of the automobile identification system according to the first optical embodiment of the present invention.

As shown in FIG. 6, the camera lens includes six lenses with refractive power, which are a first lens 11, a second lens 21, a third lens 13, a four lens 14, a fifth lens 15, and a sixth lens 16.

Figure 7:
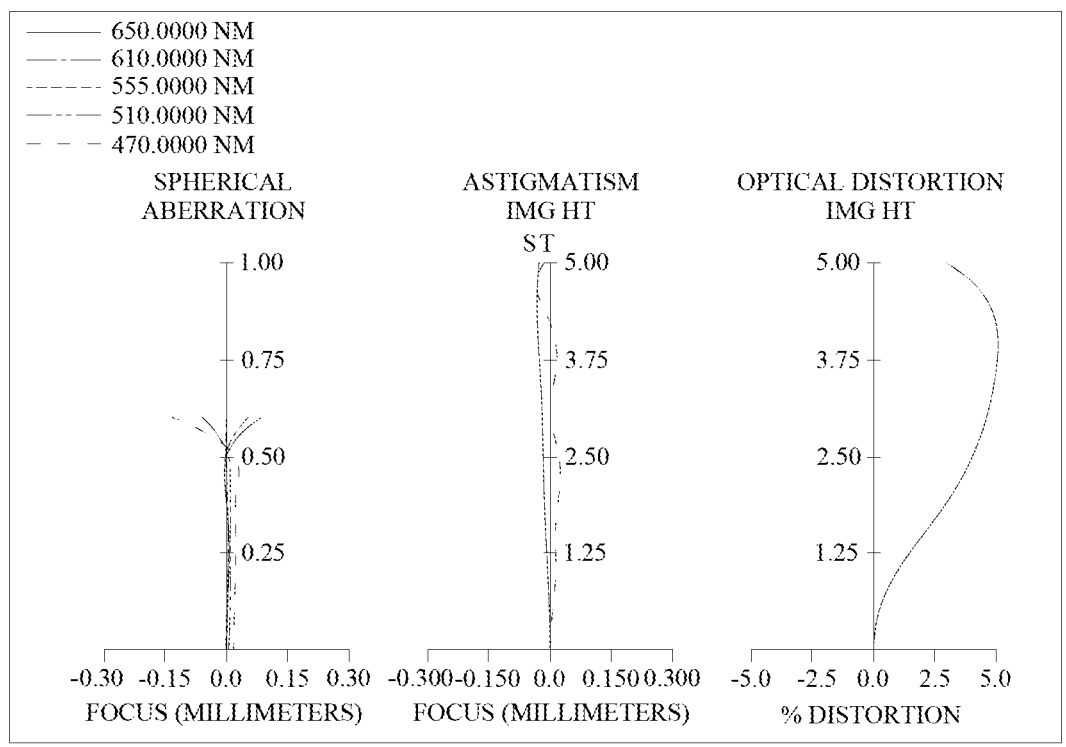
FIG. 7 depicts a curve diagram of the spherical aberration, astigmatism, and optical distortion illustrated sequentially from the left to the right according to the first optical embodiment of the present invention.

Please refer to FIG. 6 and FIG. 7. FIG. 6 depicts a configuration diagram of the camera lens of the automobile identification system according to the first embodiment of the present invention. FIG. 7 is a curve diagram of the spherical aberration, astigmatism, and optical distortion illustrated sequentially from the left to the right according to the first optical embodiment of the present invention. As shown in FIG. 6, the camera lens includes a first lens 11, an aperture 60, a second lens 12, a third lens 13, a four lens 14, a fifth lens 15, a sixth lens 16, an IR-cut filter 70, an image plane, and a first fingerprint sensor F1 or a second fingerprint sensor F2 sequentially displayed from an object side to an image side.

The first lens 11 has negative refractive power and is made of a plastic material. The object side surface 111 thereof is a concave surface and the image side surface 112 thereof is a concave surface, both of which are aspheric. The object side surface 111 thereof has two inflection points. ARS11 denotes the arc length of the maximum effective half diameter of the object side surface 111 of the first lens 11. ARS12 denotes the arc length of the maximum effective half diameter of the image side surface 112 of the first lens 11. ARE11 denotes the arc length of half the entrance pupil diameter (HEP) of the object side surface 111 of the first lens 11. ARE12 denotes the arc length of half the entrance pupil diameter (HEP) of the image side surface 112 of the first lens 11. TP1 is the thickness of the first lens 11 on the optical axis.

SGI111 denotes a distance parallel to the optical axis from the inflection point on the object side surface 111 of the first lens 11 which is the nearest to the optical axis to an axial point on the object side surface 111 of the first lens 11. SGI121 denotes a distance parallel to an optical axis from an inflection point on the image side surface 112 of the first lens 11 which is the nearest to the optical axis to an axial point on the image side surface 112 of the first lens 11. The following conditions are satisfied: SGI111=−0.0031 mm; |SGI111/(|SGI111|+TP1)=0.0016.

SGI112 denotes the distance parallel to the optical axis from the inflection point on the object side surface 111 of the first lens 11 which is the second nearest to the optical axis to an axial point on the object side surface 111 of the first lens 11. SGI122 denotes the distance parallel to an optical axis from an inflection point on the image side surface 112 of the first lens 11 which is the second nearest to the optical axis to an axial point on the image side surface 112 of the first lens 11. The following conditions are satisfied: SGI112=1.3178 mm; |SGI112|/(|SGI112|+TP1)=0.4052.

HIF111 denotes the distance perpendicular to the optical axis between the inflection point on the object side surface 111 of the first lens 11 which is the nearest to the optical axis and the optical axis. HIF121 denotes the distance perpendicular to the optical axis between an axial point on the image side surface 112 of the first lens 11 and an inflection point on the image side surface 112 of the first lens 11 which is the nearest to the optical axis. The following conditions are satisfied: HIF111=0.5557 mm; HIF111/HOI=0.1111.

HIF112 denotes the distance perpendicular to the optical axis between the inflection point on the object side surface 111 of the first lens 11 which is the second nearest to the optical axis and the optical axis. HIF122 denotes the distance perpendicular to the optical axis between an axial point on the image side surface 112 of the first lens 11 and an inflection point on the image side surface 112 of the first lens 11 which is the second nearest to the optical axis. The following conditions are satisfied: HIF112=5.3732 mm; HIF112/HOI=1.0746.

The second lens 12 has positive refractive power and is made of a plastic material. The object side surface 121 thereof is a convex surface and the image side surface 122 thereof is a convex surface, both of which are aspheric. The object side surface 121 thereof has an inflection point. ARS21 denotes the arc length of the maximum effective half diameter of the object side surface 121 of the second lens 12. ARS22 denotes the arc length of the maximum effective half diameter of the image side surface 122 of the second lens 12. ARE21 denotes an arc length of half the entrance pupil diameter (HEP) of the object side surface 121 of the second lens 12. ARE22 denotes the arc length of half the entrance pupil diameter (HEP) of the image side surface 122 of the second lens 12. TP2 is the thickness of the second lens 12 on the optical axis.

SGI211 denotes the distance parallel to the optical axis from the inflection point on the object side surface 121 of the second lens 12 which is the nearest to the optical axis to an axial point on the object side surface 121 of the second lens 12. SGI221 denotes the distance parallel to an optical axis from an inflection point on the image side surface 122 of the second lens 12 which is the nearest to the optical axis to an axial point on the image side surface 122 of the second lens 12. The following conditions are satisfied: SGI211=0.1069 mm; |SGI211|/(|SGI211|+TP2)=0.0412; SGI221=0 mm; |SGI221|/(|SGI221|+TP2)=0.

HIF211 denotes the distance perpendicular to the optical axis between the inflection point on the object side surface 121 of the second lens 12 which is the nearest to the optical axis and the optical axis. HIF221 denotes the distance perpendicular to the optical axis between an axial point on the image side surface 122 of the second lens 12 and an inflection point on the image side surface 122 of the second lens 12 which is the nearest to the optical axis. The following conditions are satisfied: HIF211=1.1264 mm; HIF211/HOI=0.2253; HIF221=0 mm; HIF221/HOI=0.

The third lens 13 has negative refractive power and is made of a plastic material. The object side surface 131 thereof is a concave surface and the image side surface 132 thereof is a convex surface, both of which are aspheric. The object side surface 131 and the image side surface 132 thereof both have an inflection point. ARS31 denotes the arc length of the maximum effective half diameter of the object side surface 131 of the third lens 13. ARS32 denotes an arc length of the maximum effective half diameter of the image side surface 132 of the third lens 13. ARE31 denotes the arc length of half the entrance pupil diameter (HEP) of the object side surface 131 of the third lens 13. ARE32 denotes the arc length of half the entrance pupil diameter (HEP) of the image side surface 132 of the third lens 13. TP3 is the thickness of the third lens 13 on the optical axis.

SGI311 denotes the distance parallel to the optical axis from the inflection point on the object side surface 131 of the third lens 13 which is the nearest to the optical axis to an axial point on the object side surface 131 of the third lens 13. SGI321 denotes the distance parallel to an optical axis from an inflection point on the image side surface 132 of the third lens 13 which is the nearest to the optical axis to an axial point on the image side surface 132 of the third lens 13. The following conditions are satisfied: SGI311=−0.3041 mm; |SGI311|/(|SGI311|+TP3)=0.4445; SGI321=−0.1172 mm; |SGI321|/(|SGI321|+TP3)=0.2357.

HIF311 denotes the distance perpendicular to the optical axis between the inflection point on the object side surface 131 of the third lens 13 which is the nearest to the optical axis and the optical axis. HIF321 denotes the distance perpendicular to the optical axis between an axial point on the image side surface 132 of the third lens 13 and an inflection point on the image side surface 132 of the third lens 12 which is the nearest to the optical axis. The following conditions are satisfied: HIF311=1.5907 mm; HIF311/HOI=0.3181; HIF321=1.3380 mm; HIF321/HOI=0.2676.

The fourth lens 14 has positive refractive power and is made of a plastic material. The object side surface 141 thereof is a convex surface and the image side surface 142 thereof is a concave surface, both of which are aspheric. The object side surface 141 thereof has two inflection points and the image side surface 142 thereof has an inflection point. ARS41 denotes the arc length of the maximum effective half diameter of the object side surface 141 of the fourth lens 14. ARS42 denotes the arc length of the maximum effective half diameter of the image side surface 142 of the fourth lens 14. ARE41 denotes the arc length of half the entrance pupil diameter (HEP) of the object side surface 141 of the fourth lens 14. ARE42 denotes the arc length of half the entrance pupil diameter (HEP) of the image side surface 142 of the fourth lens 14. TP4 is the thickness of the fourth lens 14 on the optical axis.

SGI411 denotes the distance parallel to the optical axis from the inflection point on the object side surface 141 of the fourth lens 14 which is the nearest to the optical axis to an axial point on the object side surface 141 of the fourth lens 14. SGI421 denotes the distance parallel to an optical axis from an inflection point on the image side surface 142 of the fourth lens 14 which is the nearest to the optical axis to an axial point on the image side surface 142 of the fourth lens 14. The following conditions are satisfied: SGI411=0.0070 mm; |SGI411|/(|SGI411|+TP4)=0.0056; SGI421=0.0006 mm; |SGI421|/(|SGI421|+TP4)=0.0005.

SGI412 denotes the distance parallel to the optical axis from the inflection point on the object side surface 141 of the fourth lens 14 which is the second nearest to the optical axis to an axial point on the object side surface 141 of the fourth lens 14. SGI422 denotes the distance parallel to an optical axis from an inflection point on the image side surface 142 of the fourth lens 14 which is the second nearest to the optical axis to an axial point on the image side surface 142 of the fourth lens 14. The following conditions are satisfied: SGI412=−0.2078 mm; SGI412|/(|SGI412|+TP4)=0.1439.

HIF411 denotes the distance perpendicular to the optical axis between the inflection point on the object side surface 141 of the fourth lens 14 which is the nearest to the optical axis and the optical axis. HIF421 denotes the distance perpendicular to the optical axis between an axial point on the image side surface 142 of the fourth lens 14 and an inflection point on the image side surface 142 of the fourth lens 14 which is the nearest to the optical axis. The following conditions are satisfied: HIF411=0.4706 mm; HIF411/HOI=0.0941; HIF421=0.1721 mm; HIF421/HOI=0.0344.

HIF412 denotes the distance perpendicular to the optical axis between the inflection point on the object side surface 141 of the fourth lens 14 which is the second nearest to the optical axis and the optical axis. HIF422 denotes the distance perpendicular to the optical axis between an axial point on the image side surface 142 of the fourth lens 14 and an inflection point on the image side surface 142 of the fourth lens 14 which is the second nearest to the optical axis. The following conditions are satisfied: HIF412=2.0421 mm; HIF412/HOI=0.4084.

The fifth lens 15 has positive refractive power and is made of a plastic material. The object side surface 151 thereof is a convex surface and the image side surface 152 thereof is a convex surface, both of which are aspheric. The object side surface 151 thereof has two inflection points and the image side surface 152 thereof has an inflection point. ARS51 denotes the arc length of the maximum effective half diameter of the object side surface 151 of the fifth lens 15. ARS52 denotes the arc length of the maximum effective half diameter of the image side surface 152 of the fifth lens 15. ARE51 denotes the arc length of half the entrance pupil diameter (HEP) of the object side surface 151 of the fifth lens 15. ARE52 denotes the arc length of half the entrance pupil diameter (HEP) of the image side surface 152 of the fifth lens 15. TP5 is the thickness of the fifth lens 15 on the optical axis.

SGI511 denotes the distance parallel to the optical axis from the inflection point on the object side surface 151 of the fifth lens 15 which is the nearest to the optical axis to an axial point on the object side surface 151 of the fifth lens 15. SGI521 denotes the distance parallel to an optical axis from an inflection point on the image side surface 152 of the fifth lens 15 which is the nearest to the optical axis to an axial point on the image side surface 152 of the fifth lens 15. The following conditions are satisfied: SGI511=0.00364 mm; |SGI511|/(|SGI511|+TP5)=0.00338; SGI521=−0.63365 mm; |SGI521|/(|SGI521|+TP5)=0.37154.

SGI512 denotes the distance parallel to the optical axis from the inflection point on the object side surface 151 of the fifth lens 15 which is the second nearest to the optical axis to an axial point on the object side surface 151 of the fifth lens 15. SGI522 denotes the distance parallel to an optical axis from an inflection point on the image side surface 152 of the fifth lens 15 which is the second nearest to the optical axis to an axial point on the image side surface 152 of the fifth lens 15. The following conditions are satisfied: SGI512=−0.32032 mm; |SGI512|/(|SGI512|+TP5)=0.23009.

SGI513 denotes the distance parallel to the optical axis from the inflection point on the object side surface 151 of the fifth lens 15 which is the third nearest to the optical axis to an axial point on the object side surface 151 of the fifth lens 15. SGI523 denotes the distance parallel to an optical axis from an inflection point on the image side surface 152 of the fifth lens 15 which is the third nearest to the optical axis to an axial point on the image side surface 152 of the fifth lens 15. The following conditions are satisfied: SGI513=0 mm; |SGI513|/(|SGI513|+TP5)=0; SGI523=0 mm; |SGI523|/(|SGI523|+TP5)=0.

SGI514 denotes the distance parallel to the optical axis from the inflection point on the object side surface 151 of the fifth lens 15 which is the fourth nearest to the optical axis to an axial point on the object side surface 151 of the fifth lens 15. SGI524 denotes a distance parallel to an optical axis from an inflection point on the image side surface 152 of the fifth lens 15 which is the fourth nearest to the optical axis to an axial point on the image side surface 152 of the fifth lens 15. The following conditions are satisfied: SGI514=0 mm; |SGI514|/(|SGI514|+TP5)=0; SGI524=0 mm; |SGI524|/(|SGI524|+TP5)=0.

HIF511 denotes the distance perpendicular to the optical axis between the inflection point on the object side surface 151 of the fifth lens 15 which is the nearest to the optical axis and the optical axis. HIF521 denotes the distance perpendicular to the optical axis between the optical axis and an inflection point on the image side surface 152 of the fifth lens 15 which is the nearest to the optical axis. The following conditions are satisfied: HIF511=0.28212 mm; HIF511/HOI=0.05642; HIF521=2.13850 mm; HIF521/HOI=0.42770.

HIF512 denotes the distance perpendicular to the optical axis between the inflection point on the object side surface 151 of the fifth lens 15 which is the second nearest to the optical axis and the optical axis. HIF522 denotes the distance perpendicular to the optical axis between the optical axis and an inflection point on the image side surface 152 of the fifth lens 15 which is the second nearest to the optical axis. The following conditions are satisfied: HIF512=2.51384 mm; HIF512/HOI=0.50277.

HIF513 denotes the distance perpendicular to the optical axis between the inflection point on the object side surface 151 of the fifth lens 15 which is the third nearest to the optical axis and the optical axis. HIF523 denotes the distance perpendicular to the optical axis between the optical axis and an inflection point on the image side surface 152 of the fifth lens 15 which is the third nearest to the optical axis. The following conditions are satisfied: HHIF513=0 mm; HIF513/HOI=0; HIF523=0 mm; HIF523/HOI=0.

HIF514 denotes the distance perpendicular to the optical axis between the inflection point on the object side surface 151 of the fifth lens 15 which is the fourth nearest to the optical axis and the optical axis. HIF524 denotes the distance perpendicular to the optical axis between the optical axis and an inflection point on the image side surface 152 of the fifth lens 15 which is the fourth nearest to the optical axis. The following conditions are satisfied: HIF514=0 mm; HIF514/HOI=0; HIF524=0 mm; HIF524/HOI=0.

The sixth lens 16 has negative refractive power and is made of a plastic material. The object side surface 161 thereof is a concave surface and the image side surface 162 thereof is a concave surface. The object side surface 161 has two inflection points and the image side surface 162 thereof has an inflection point. Therefore, it may be effective to adjust the angle at which each field of view is incident on the sixth lens 16 to improve the aberration. ARS61 denotes the arc length of the maximum effective half diameter of the object side surface 161 of the sixth lens 16. ARS62 denotes the arc length of the maximum effective half diameter of the image side surface 162 of the sixth lens 16. ARE61 denotes the arc length of half the entrance pupil diameter (HEP) of the object side surface 161 of the sixth lens 16. ARE62 denotes the arc length of half the entrance pupil diameter (HEP) of the image side surface 162 of the sixth lens 16. TP6 is the thickness of the sixth lens 16 on the optical axis.

SGI611 denotes the distance parallel to the optical axis from the inflection point on the object side surface 161 of the sixth lens 16 which is the nearest to the optical axis to an axial point on the object side surface 161 of the sixth lens 16. SGI621 denotes the distance parallel to an optical axis from an inflection point on the image side surface 162 of the sixth lens 16 which is the nearest to the optical axis to an axial point on the image side surface 162 of the sixth lens 16. The following conditions are satisfied: SGI611=−0.38558 mm; |SGI611|/(|SGI611|+TP6)=0.27212; SGI621=0.12386 mm; |SGI621|/(|SGI621|+TP6)=0.10722.

SGI612 denotes the distance parallel to the optical axis from the inflection point on the object side surface 161 of the sixth lens 16 which is the second nearest to the optical axis to an axial point on the object side surface 161 of the sixth lens 16. SGI621 denotes the distance parallel to an optical axis from an inflection point on the image side surface 162 of the sixth lens 16 which is the second nearest to the optical axis to an axial point on the image side surface 162 of the sixth lens 16. The following conditions are satisfied:

SGI612=−0.47400 mm; |SGI612|/(|SGI612|+TP6)= 0.31488; SGI622=0 mm; |SGI622|/(|SGI622|+TP6)=0.

HIF611 denotes the distance perpendicular to the optical axis between the inflection point on the object side surface 161 of the sixth lens 16 which is the nearest to the optical axis and the optical axis. HIF621 denotes the distance perpendicular to the optical axis between the inflection point on the image side surface 162 of the sixth lens 16 which is the nearest to the optical axis and the optical axis. The following conditions are satisfied: HIF611=2.24283 mm; IF611/HOI=0.44857; HIF621=1.07376 mm; HIF621/HOI=0.21475.

HIF612 denotes the distance perpendicular to the optical axis between the inflection point on the object side surface 161 of the sixth lens 16 which is the second nearest to the optical axis and the optical axis. HIF622 denotes the distance perpendicular to the optical axis between the inflection point on the image side surface 162 of the sixth lens 16 which is the second nearest to the optical axis and the optical axis. The following conditions are satisfied: HIF611=2.24283 mm; HIF612=2.48895 mm; HIF612/HOI=0.49779.

HIF613 denotes the distance perpendicular to the optical axis between the inflection point on the object side surface 161 of the sixth lens 16 which is the third nearest to the optical axis and the optical axis. HIF623 denotes the distance perpendicular to the optical axis between the inflection point on the image side surface 162 of the sixth lens 16 which is the third nearest to the optical axis and the optical axis. The following conditions are satisfied: HIF613=0 mm; HIF613/HOI=0; HIF623=0 mm; HIF623/HOI=0.

HIF614 denotes the distance perpendicular to the optical axis between the inflection point on the object side surface 161 of the sixth lens 16 which is the fourth nearest to the optical axis and the optical axis. HIF624 denotes the distance perpendicular to the optical axis between the inflection point on the image side surface 162 of the sixth lens 16 which is the fourth nearest to the optical axis and the optical axis. The following conditions are satisfied: HIF614=0 mm; HIF614/HOI=0; HIF624=0 mm; HIF624/HOI=0.

The IR-cut filter 70 is made of glass and is disposed between the sixth lens 16 and the first fingerprint sensor F1, which does not affect the focal length of the camera lens.

In of the embodiment, f is the focal length of the camera lens. HEP is the entrance pupil diameter of the camera lens. HAF is half of the maximum view angle of the camera lens. The detailed parameters are shown as below: f=4.075 mm, f/HEP=1.4, HAF=50.001°, and tan(HAF)=1.1918.

In the camera lens of the embodiment, f1 is the focal length of the first lens 11. f6 is a focal length of the sixth lens 16. The following conditions are satisfied: f1=−7.828 mm; |f/f1|=0.52060; f6=−4.886; and |f1|>|f6|.

In the camera lens of the embodiment, the focal lengths of the second lens 12 to the fifth lens 15 are f2, f3, f4, and f5, respectively. The following conditions are satisfied: |f2|+|f3|+|f4|+|f5|=95.50815 mm; |f1|+|f6|=12.71352 mm and |f2|+|f3|+|f4|+|f5|>|f1|+|f6|.

PPR is the ratio of the focal length f of the camera lens to a focal length fp of each of lenses with positive refractive power. NPR is the ratio of the focal length f of the camera lens to a focal length fn of each of lenses with negative refractive power. In the camera lens of the embodiment, The sum of the PPR of all lenses with positive refractive power is ΣPPR=f/f2+f/f4+f/f5=1.63290. The sum of the NPR of all lenses with negative refractive power is ΣNPR=|f/f1|+|f/f3|+|f/f6|=1.51305, and ΣPPR/|ΣNPR|=1.07921. The following conditions are also satisfied: |f/f2|=0.69101; |f/f3|=0.15834; |f/f4|=0.06883; |f/f5|=0.87305; |f/f6|=0.83412.

In the camera lens of the embodiment, InTL is the distance on the optical axis from an object side surface 111 of the first lens 11 to an image side surface 162 of the sixth lens 16. HOS is the distance on the optical axis from an object side surface 111 of the first lens 11 to the image plane. InS is a distance from the aperture 60 to the image plane. HOI is defined as half the diagonal of the sensing field of the a first fingerprint sensor F1. BFL is the distance from the image side surface 162 of the sixth lens 16 and the image plane. The following conditions are satisfied: InTL+BFL=HOS; HOS=19.54120 mm; HOI=5.0 mm; HOS/HOI=3.90824; HOS/f=4.7952; InS=11.685 mm; and InS/HOS=0.59794.

In the camera lens of the embodiment, ΣTP is the sum of the thicknesses of all the lenses with refractive power on the optical axis. The following condition is satisfied: ΣTP=8.13899 mm, ΣTP/InTL=0.52477, and InTL/HOS=0.917102. Therefore, the contrast ratio of system imaging and the yield rate of lens manufacturing may be attended simultaneously. Moreover, an appropriate back focal length is provided to accommodate other elements.

In the camera lens of the embodiment, R1 is the curvature radius of the object side surface 111 of the first lens 11. R2 is the curvature radius of the image side surface 112 of the first lens 11. The following condition is satisfied: |R1/R2|=8.99987. Therefore, the first lens 11 is equipped with appropriate intensity of positive refractive power to prevent the spherical aberration from increasing too fast.

In the camera lens of the embodiment, R11 is the curvature radius of the object side surface 161 of the sixth lens 16. R12 is the curvature radius of the image side surface 162 of the sixth lens 16. This following condition is satisfied: (R11−R12)/(R11+R12)=1.27780. Therefore, it is advantageous to correct the astigmatism generated by the camera lens.

In the camera lens of the embodiment, ΣPP is the sum of the focal lengths of all lenses with positive refractive power. The following conditions are satisfied: ΣPP=f2+f4+f5=69.770 mm and f5/(f2+f4+f5)=0.067. Therefore, it is beneficial to properly distribute the positive refractive power of a single lens to other positive lenses to suppress the generation of significant aberrations during the traveling of incident light.

In the camera lens of the embodiment, ΣNP is the sum of the focal lengths of all lenses with negative refractive power. The following conditions are satisfied: ΣNP=f1+f3+f6=−38.451 mm and f6/(f1+f3+f6)=0.127. Therefore, it is beneficial to properly distribute the negative refractive power of the sixth lens 16 to other negative lenses to suppress the generation of significant aberrations during the traveling of incident light.

In the camera lens of the embodiment, IN12 is the distance between the first lens 11 and the second lens 12 on the optical axis. The following condition is satisfied: IN12=6.418 mm; IN12/f=1.57491. Therefore, it is beneficial to improve the chromatic aberration of the lenses so as to enhance the performance.

In the camera lens of the embodiment, IN56 is a distance between the fifth lens 15 and the sixth lens 16 on the optical axis. The following condition is satisfied: IN56=0.025 mm; IN56/f=0.00613. Therefore, it is beneficial to improve the chromatic aberration of the lenses so as to enhance the performance.

In the camera lens of the embodiment, TP1 and TP2 are respectively the thicknesses of the first lens 11 and the second lens 12 on the optical axis. The following condition is satisfied: TP1=1.934mm; TP2=2.486 mm; and (TP1+IN12)/TP2=3.36005. Therefore, it is beneficial to control the sensitivity produced by the camera lens so as to enhance the performance.

In the camera lens of the embodiment, TP5 and TP6 are respectively the thicknesses of the fifth lens 15 and the sixth lens 16 on the optical axis. IN56 is a distance between the two lenses on the optical axis. The following conditions are satisfied: TP5=1.072 mm; TP6=1.031 mm; (TP6+IN56)/TP5=0.98555. Therefore, it is beneficial to control the sensitivity produced by the camera lens so as to enhance the performance.

In the camera lens of the embodiment, IN34 is a distance between the third lens 13 and the fourth lens 14 on the optical axis. IN45 is a distance between the fourth lens 14 and the fifth lens 15 on the optical axis. The following conditions are satisfied: IN34=0.401 mm; IN45=0.025 mm; and TP4/(IN34+TP4+IN45)=0.74376. Therefore, it is beneficial to slightly correct the aberration generated by the incident light advancing in the process layer upon layer so as to decrease the overall height of the system.

In the camera lens of the embodiment, InRS51 is the horizontal distance parallel to an optical axis from a maximum effective half diameter position to an axial point on the object side surface 151 of the fifth lens 15. InRS52 is the horizontal distance parallel to an optical axis from a maximum effective half diameter position to an axial point on the image side surface 152 of the fifth lens 15. TP5 is the thickness of the fifth lens 15 on the optical axis. The following condition is satisfied: InRS51=−0.34789 mm; InRS52=−0.88185 mm; |InRS51|/TP5=0.32458 and |InRS52|/TP5=0.82276. Therefore, it is advantageous for the lens to be manufactured and formed so as to maintain minimization.

In the camera lens of the embodiment, HVT51 is the distance perpendicular to the optical axis between a critical point on an object side surface 151 of the fifth lens 15 and the optical axis. HVT52 is the distance perpendicular to the optical axis between a critical point on an image side surface 152 of the fifth lens 15 and the optical axis. The following conditions are satisfied: HVT51=0.515349 mm; HVT52=0 mm.

In the camera lens of the embodiment, InRS61 is the horizontal distance parallel to an optical axis from a maximum effective half diameter position to an axial point on the object side surface 161 of the sixth lens 16. InRS62 is the horizontal distance parallel to an optical axis from a maximum effective half diameter position to an axial point on the image side surface 162 of the sixth lens 16. TP6 is the thickness of the sixth lens 16 on the optical axis. The following conditions are satisfied: InRS61=−0.58390 mm; InRS62=0.41976 mm; |InRS61|/TP6=0.56616 and- |InRS62|/TP6=0.40700. Therefore, it is advantageous for the lens to be manufactured and formed so as to maintain minimization.

In the camera lens of the embodiment, HVT61 is the distance perpendicular to the optical axis between a critical point on an object side surface 161 of the sixth lens 16 and the optical axis. HVT62 is the distance perpendicular to the optical axis between a critical point on an image side surface 162 of the sixth lens 16 and the optical axis. The following conditions are satisfied: HVT61=0 mm; HVT62=0 mm.

In the camera lens of the embodiment, the following conditions are satisfied: HVT51/HOI=0.1031. Therefore, it is beneficial to correct the aberration of the surrounding view field of the camera lens.

In the camera lens of the embodiment, the following conditions are satisfied: HVT51/HOS=0.02634. Therefore, it is beneficial to correct the aberration of the surrounding view field of the camera lens.

In the camera lens of the embodiment, the second lens 12, the third lens 13, and the sixth lens 16 have negative refractive power. A dispersion coefficient of the second lens 12 is NA2. A dispersion coefficient of the third lens 13 is NA3. A dispersion coefficient of the sixth lens 16 is NA6. The following condition is satisfied: NA6/NA2≤1. Therefore, it is beneficial to correct the aberration of the camera lens.

In the camera lens of the embodiment, TDT refers to TV distortion when an image is formed. ODT refers to optical distortion when an image is formed. The following conditions are satisfied: TDT=2.124%; ODT=5.076%.

In the camera lens of the embodiment, LS is 12 mm. PhiA is 2*EHD62=6.726 mm (EHD62: the maximum effective half diameter of the image side 162 of the sixth lens 16). PhiC=PhiA+2*TH2=7.026 mm; PhiD=PhiC+2*(TH1+TH2)=7.426 mm; TH1 is 0.2 mm; TH2 is 0.15 mm; PhiA/PhiD is 0.9057; TH1+TH2 is 0.35 mm; (TH1+TH2)/HOI is 0.035; (TH1+TH2)/HOS is 0.0179; 2*(TH1+TH2)/PhiA is 0.1041; (TH1+TH2)/LS is 0.0292.

Please refer to Table 1 and Table 2 in the following.

TABLE 1

Data of the camera lens of the first optical embodiment
f = 4.075 mm; f/HEP = 1.4; HAF = 50.000 deg

| Surface | | Curvature Radius | Thickness (mm) | Material |
|---|---|---|---|---|
| 0 | Object | Plano | Plano | |
| 1 | Lens 1 | −40.99625704 | 1.934 | Plastic |
| 2 | | 4.555209289 | 5.923 | |
| 3 | Aperture | Plano | 0.495 | |
| 4 | Lens 2 | 5.333427366 | 2.486 | Plastic |
| 5 | | −6.781659971 | 0.502 | |
| 6 | Lens 3 | −5.697794287 | 0.380 | Plastic |
| 7 | | −8.883957518 | 0.401 | |
| 8 | Lens 4 | 13.19225664 | 1.236 | Plastic |
| 9 | | 21.55681832 | 0.025 | |
| 10 | Lens 5 | 8.987806345 | 1.072 | Plastic |
| 11 | | −3.158875374 | 0.025 | |
| 12 | Lens 6 | −29.46491425 | 1.031 | Plastic |
| 13 | | 3.593484273 | 2.412 | |
| 14 | IR-cut filter | Plano | 0.200 | |
| 15 | | Plano | 1.420 | |
| 16 | Image plane | Plano | | |

| Surface | Refractive index | Dispersion coefficient | Focal length |
|---|---|---|---|
| 0 | | | |
| 1 | 1.515 | 56.55 | −7.828 |
| 2 | | | |
| 3 | | | |
| 4 | 1.544 | 55.96 | 5.897 |
| 5 | | | |
| 6 | 1.642 | 22.46 | −25.738 |
| 7 | | | |
| 8 | 1.544 | 55.96 | 59.205 |
| 9 | | | |
| 10 | 1.515 | 56.55 | 4.668 |
| 11 | | | |
| 12 | 1.642 | 22.46 | −4.886 |
| 13 | | | |
| 14 | 1.517 | 64.13 | |
| 15 | | | |
| 16 | | | |

Reference wavelength = 555 nm; Shield position: The clear aperture of the first surface is 5.800 mm. The clear aperture of the third surface is 1.570 mm.
The clear aperture of the fifth surface is 1.950 mm.

TABLE 2

The aspheric surface parameters of the first optical embodiment
Aspheric Coefficients

| Surface | 1 | 2 | 4 | 5 |
|---|---|---|---|---|
| k | 4.310876E+01 | −4.707622E+00 | 2.616025E+00 | 2.445397E+00 |
| A4 | 7.054243E−03 | 1.714312E−02 | −8.377541E−03 | −1.789549E−02 |
| A6 | −5.233264E−04 | −1.502232E−04 | −1.838068E−03 | −3.657520E−03 |
| A8 | 3.077890E−05 | −1.359611E−04 | 1.233332E−03 | −1.131622E−03 |
| A10 | −1.260650E−06 | 2.680747E−05 | −2.390895E−03 | 1.390351E−03 |
| A12 | 3.319093E−08 | −2.017491E−06 | 1.998555E−03 | −4.152857E−04 |
| A14 | −5.051600E−10 | 6.604615E−08 | −9.734019E−04 | 5.487286E−05 |
| A16 | 3.380000E−12 | −1.301630E−09 | 2.478373E−04 | −2.919339E−06 |

| Surface | 6 | 7 | 8 | 9 |
|---|---|---|---|---|
| k | 5.645686E+00 | −2.117147E+01 | −5.287220E+00 | 6.200000E+01 |
| A4 | −3.379055E−03 | −1.370959E−02 | −2.937377E−02 | −1.359965E−01 |
| A6 | −1.225453E−03 | 6.250200E−03 | 2.743532E−03 | 6.628518E−02 |
| A8 | −5.979572E−03 | −5.854426E−03 | −2.457574E−03 | −2.129167E−02 |
| A10 | 4.556449E−03 | 4.049451E−03 | 1.874319E−03 | 4.396344E−03 |
| A12 | −1.177175E−03 | −1.314592E−03 | −6.013661E−04 | −5.542899E−04 |
| A14 | 1.370522E−04 | 2.143097E−04 | 8.792480E−05 | 3.768879E−05 |
| A16 | −5.974015E−06 | −1.399894E−05 | −4.770527E−06 | −1.052467E−06 |

| Surface | 10 | 11 | 12 | 13 |
|---|---|---|---|---|
| k | −2.114008E+01 | −7.699904E+00 | −6.155476E+01 | −3.120467E−01 |
| A4 | −1.263831E−01 | −1.927804E−02 | −2.492467E−02 | −3.521844E−02 |
| A6 | 6.965399E−02 | 2.478376E−03 | −1.835360E−03 | 5.629654E−03 |
| A8 | −2.116027E−02 | 1.438785E−03 | 3.201343E−03 | −5.466925E−04 |
| A10 | 3.819371E−03 | −7.013749E−04 | −8.990757E−04 | 2.231154E−05 |
| A12 | −4.040283E−04 | 1.253214E−04 | 1.245343E−04 | 5.548990E−07 |
| A14 | 2.280473E−05 | −9.943196E−06 | −8.788363E−06 | −9.396920E−08 |
| A16 | −5.165452E−07 | 2.898397E−07 | 2.494302E−07 | 2.728360E−09 |

The values related to arc lengths may be obtained according to Table 1 and Table 2.

First optical embodiment (Reference wavelength = 555 nm)

| ARE | ½(HEP) | ARE value | ARE − ½(HEP) | 2(ARE/HEP) % | TP | ARE/TP (%) |
|---|---|---|---|---|---|---|
| 11 | 1.455 | 1.455 | −0.00033 | 99.98% | 1.934 | 75.23% |
| 12 | 1.455 | 1.495 | 0.03957 | 102.72% | 1.934 | 77.29% |
| 21 | 1.455 | 1.465 | 0.00940 | 100.65% | 2.486 | 58.93% |
| 22 | 1.455 | 1.495 | 0.03950 | 102.71% | 2.486 | 60.14% |
| 31 | 1.455 | 1.486 | 0.03045 | 102.09% | 0.380 | 391.02% |
| 32 | 1.455 | 1.464 | 0.00830 | 100.57% | 0.380 | 385.19% |
| 41 | 1.455 | 1.458 | 0.00237 | 100.16% | 1.236 | 117.95% |
| 42 | 1.455 | 1.484 | 0.02825 | 101.94% | 1.236 | 120.04% |
| 51 | 1.455 | 1.462 | 0.00672 | 100.46% | 1.072 | 136.42% |
| 52 | 1.455 | 1.499 | 0.04335 | 102.98% | 1.072 | 139.83% |
| 61 | 1.455 | 1.465 | 0.00964 | 100.66% | 1.031 | 142.06% |
| 62 | 1.455 | 1.469 | 0.01374 | 100.94% | 1.031 | 142.45% |

| ARS | EHD | ARS value | ARS − EHD | (ARS/EHD)% | TP | ARS/TP (%) |
|---|---|---|---|---|---|---|
| 11 | 5.800 | 6.141 | 0.341 | 105.88% | 1.934 | 317.51% |
| 12 | 3.299 | 4.423 | 1.125 | 134.10% | 1.934 | 228.70% |
| 21 | 1.664 | 1.674 | 0.010 | 100.61% | 2.486 | 67.35% |
| 22 | 1.950 | 2.119 | 0.169 | 108.65% | 2.486 | 85.23% |
| 31 | 1.980 | 2.048 | 0.069 | 103.47% | 0.380 | 539.05% |
| 32 | 2.084 | 2.101 | 0.017 | 100.83% | 0.380 | 552.87% |
| 41 | 2.247 | 2.287 | 0.040 | 101.80% | 1.236 | 185.05% |
| 42 | 2.530 | 2.813 | 0.284 | 111.22% | 1.236 | 227.63% |
| 51 | 2.655 | 2.690 | 0.035 | 101.32% | 1.072 | 250.99% |
| 52 | 2.764 | 2.930 | 0.166 | 106.00% | 1.072 | 273.40% |
| 61 | 2.816 | 2.905 | 0.089 | 103.16% | 1.031 | 281.64% |
| 62 | 3.363 | 3.391 | 0.029 | 100.86% | 1.031 | 328.83% |

Table 1 is the detailed structure data to the first optical embodiment, wherein the unit of the curvature radius, the thickness, the distance, and the focal length is millimeters (mm). Surfaces 0-16 illustrate the surfaces from the object side to the image side. Table 2 is the aspheric coefficients of the first optical embodiment, wherein k is the conic coefficient in the aspheric surface formula. A1-A20 are aspheric surface coefficients from the first to the twentieth orders for each surface. In addition, the tables for each of the embodiments as follows correspond to the schematic views and the aberration graphs for each of the embodiments. The definitions of data in the tables are the same as those in Table 1 and Table 2 for the first optical embodiment. Therefore, similar description shall not be illustrated again. Furthermore, the definitions of element parameters in each of the embodiments are the same as those in the first optical embodiment.

The Second Optical Embodiment

Figure 8:
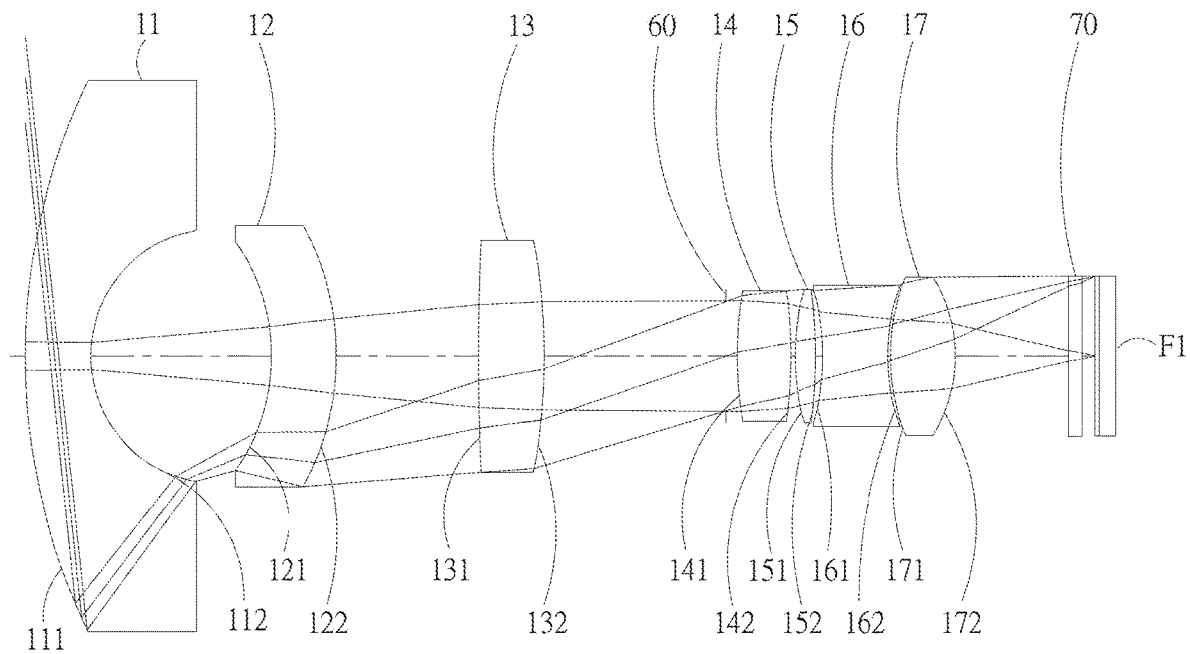
FIG. 8 depicts a configuration diagram of the camera lens of the automobile identification system according to the second optical embodiment of the present invention.

As shown in FIG. 8, the camera lens may include seven lenses with refractive power, which are a first lens 11, a second lens 12, a third lens 13, a four lens 14, a fifth lens 15, a sixth lens 16, and a seventh lens 17 sequentially displayed from an object side surface to an image side surface.

Figure 9:
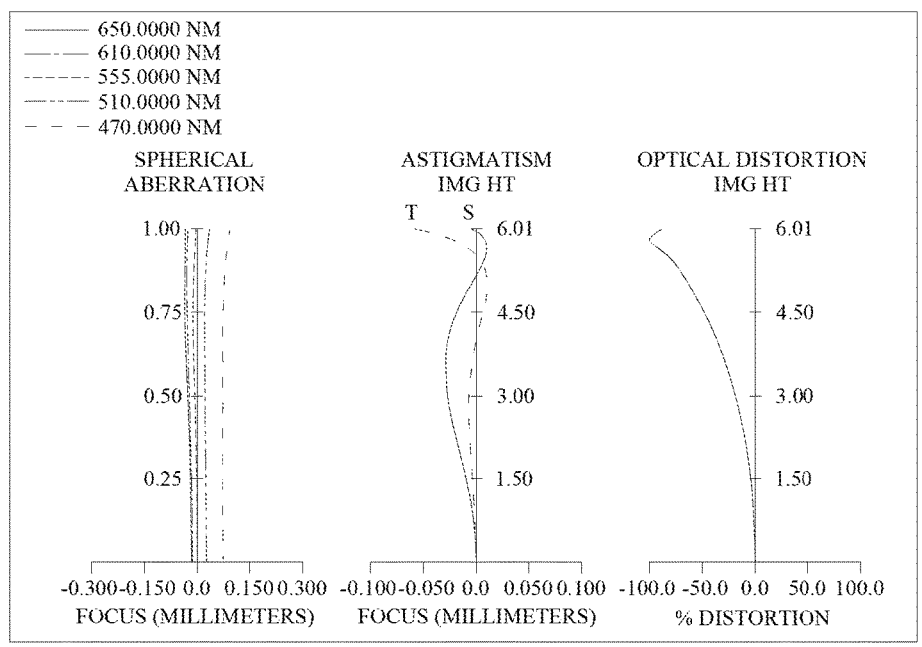
FIG. 9 depicts a curve diagram of the spherical aberration, astigmatism, and optical distortion illustrated sequentially from the left to the right according to the second optical embodiment of the present invention.

Please refer to FIG. 8 and FIG. 9. FIG. 8 depicts a configuration diagram of the camera lens of the automobile identification system according to the second optical embodiment of the present invention. FIG. 9 depicts a curve diagram of the spherical aberration, astigmatism, and optical distortion illustrated sequentially from the left to the right according to the second optical embodiment of the present invention. As shown in FIG. 8, the camera lens includes a first lens 11, a second lens 12, a third lens 13, an aperture 60, a four lens 14, a fifth lens 15, a sixth lens 16, a seventh lens 17, an IR-cut filter 70, an image plane, and a first fingerprint sensor F1 or a second fingerprint sensor F2 sequentially displayed from an object side to an image side.

The first lens 11 has negative refractive power and is made of a glass material. The object side surface 111 thereof is a convex surface and the image side surface 112 thereof is a concave surface.

The second lens 12 has negative refractive power and is made of a glass material. The object side surface thereof 121 is a concave surface and the image side surface thereof 122 is a convex surface.

The third lens 13 has positive refractive power and is made of a glass material. The object side surface 131 thereof is a convex surface and the image side surface 132 thereof is a convex surface.

The fourth lens 14 has positive refractive power and is made of a glass material. The object side surface 141 thereof is a convex surface and the image side surface 142 thereof is a convex surface.

The fifth lens 15 has positive refractive power and is made of a glass material. The object side surface 151 thereof is a convex surface and the image side surface 152 thereof is a convex surface.

The sixth lens 16 has negative refractive power and is made of a glass material. The object side surface 161 thereof is a concave surface and the image side surface 162 thereof is a concave surface. Therefore, it may be effective to adjust the angle at which each field of view is incident on the sixth lens 16 to improve the aberration.

The seventh lens 17 has negative refractive power and is made of a glass material. The object side surface 171 thereof is a convex surface and the image side surface 172 thereof is a convex surface. Therefore, it is advantageous for the lens to reduce the back focal length to maintain minimization. In addition, it is effective to suppress the incident angle with incoming light from an off-axis view field and further correct the aberration in the off-axis view field.

The IR-cut filter 70 is made of glass and is disposed between the seventh lens 17 and the first fingerprint sensor F1, which does not affect the focal length of the camera lens.

Please refer to the following Table 3 and Table 4.

TABLE 3

Data of the camera lens of the second optical embodiment
f = 4.7601 mm; f/HEP = 2.2; HAF = 95.98 deg

| Surface | | Curvature Radius | Thickness(mm) | Material |
|---|---|---|---|---|
| 0 | Object | 1E+18 | 1E+18 | |
| 1 | Lens 1 | 47.71478323 | 4.977 | Glass |
| 2 | | 9.527614761 | 13.737 | |
| 3 | Lens 2 | −14.88061107 | 5.000 | Glass |
| 4 | | −20.42046946 | 10.837 | |
| 5 | Lens 3 | 182.4762997 | 5.000 | Glass |
| 6 | | −46.71963608 | 13.902 | |
| 7 | Aperture | 1E+18 | 0.850 | |
| 8 | Lens 4 | 28.60018103 | 4.095 | Glass |
| 9 | | −35.08507586 | 0.323 | |
| 10 | Lens 5 | 18.25991342 | 1.539 | Glass |
| 11 | | −36.99028878 | 0.546 | |
| 12 | Lens 6 | −18.24574524 | 5.000 | Glass |
| 13 | | 15.33897192 | 0.215 | |
| 14 | Lens 7 | 16.13218937 | 4.933 | Glass |
| 15 | | −11.24007 | 8.664 | |
| 16 | IR-cut filter | 1E+18 | 1.000 | BK_7 |
| 17 | | 1E+18 | 1.007 | |
| 18 | Image plane | 1E+18 | −0.007 | |

| Surface | Refractive index | Dispersion coefficient | Focal length |
|---|---|---|---|
| 0 | | | |
| 1 | 2.001 | 29.13 | −12.647 |
| 2 | | | |
| 3 | 2.001 | 29.13 | −99.541 |
| 4 | | | |
| 5 | 1.847 | 23.78 | 44.046 |
| 6 | | | |
| 7 | | | |
| 8 | 1.834 | 37.35 | 19.369 |
| 9 | | | |
| 10 | 1.609 | 46.44 | 20.223 |
| 11 | | | |
| 12 | 2.002 | 19.32 | −7.668 |
| 13 | | | |
| 14 | 1.517 | 64.20 | 13.620 |
| 15 | | | |
| 16 | 1.517 | 64.2 | |
| 17 | | | |
| 18 | | | |

Reference Wavelength = 555 nm

TABLE 4

The aspheric surface parameters of the second optical embodiment
Aspheric Coefficients

| Surface | 1 | 2 | 3 | 4 |
|---|---|---|---|---|
| k | 0.000000E+00 | 0.000000E+00 | 0.000000E+00 | 0.000000E+00 |
| A4 | 0.000000E+00 | 0.000000E+00 | 0.000000E+00 | 0.000000E+00 |
| A6 | 0.000000E+00 | 0.000000E+00 | 0.000000E+00 | 0.000000E+00 |
| A8 | 0.000000E+00 | 0.000000E+00 | 0.000000E+00 | 0.000000E+00 |
| A10 | 0.000000E+00 | 0.000000E+00 | 0.000000E+00 | 0.000000E+00 |
| A12 | 0.000000E+00 | 0.000000E+00 | 0.000000E+00 | 0.000000E+00 |

| Surface | 5 | 6 | 8 | 9 |
|---|---|---|---|---|
| k | 0.000000E+00 | 0.000000E+00 | 0.000000E+00 | 0.000000E+00 |
| A4 | 0.000000E+00 | 0.000000E+00 | 0.000000E+00 | 0.000000E+00 |
| A6 | 0.000000E+00 | 0.000000E+00 | 0.000000E+00 | 0.000000E+00 |
| A8 | 0.000000E+00 | 0.000000E+00 | 0.000000E+00 | 0.000000E+00 |
| A10 | 0.000000E+00 | 0.000000E+00 | 0.000000E+00 | 0.000000E+00 |
| A12 | 0.000000E+00 | 0.000000E+00 | 0.000000E+00 | 0.000000E+00 |

| Surface | 10 | 11 | 12 | 13 |
|---|---|---|---|---|
| k | 0.000000E+00 | 0.000000E+00 | 0.000000E+00 | 0.000000E+00 |
| A4 | 0.000000E+00 | 0.000000E+00 | 0.000000E+00 | 0.000000E+00 |
| A6 | 0.000000E+00 | 0.000000E+00 | 0.000000E+00 | 0.000000E+00 |
| A8 | 0.000000E+00 | 0.000000E+00 | 0.000000E+00 | 0.000000E+00 |

TABLE 4-continued

The aspheric surface parameters of the second optical embodiment
Aspheric Coefficients

| | | | | |
|---|---|---|---|---|
| A10 | 0.000000E+00 | 0.000000E+00 | 0.000000E+00 | 0.000000E+00 |
| A12 | 0.000000E+00 | 0.000000E+00 | 0.000000E+00 | 0.000000E+00 |

| Surface | 14 | 15 |
|---|---|---|
| k | 0.000000E+00 | 0.000000E+00 |
| A4 | 0.000000E+00 | 0.000000E+00 |
| A6 | 0.000000E+00 | 0.000000E+00 |
| A8 | 0.000000E+00 | 0.000000E+00 |
| A10 | 0.000000E+00 | 0.000000E+00 |
| A12 | 0.000000E+00 | 0.000000E+00 |

In the second optical embodiment, the aspheric surface formula is presented in the same way in the first optical embodiment. In addition, the definitions of parameters in following tables are the same as those in the first optical embodiment. Therefore, similar description shall not be illustrated again.

The values stated as follows may be deduced according to Table 3 and Table 4.

The second optical embodiment (Primary reference wavelength: 555 nm)

| |f/f1| | |f/f2| | |f/f3| | |f/f4| | |f/f5| | |f/f6| |
|---|---|---|---|---|---|
| 0.3764 | 0.0478 | 0.1081 | 0.2458 | 0.2354 | 0.6208 |

| |f/f7| | ΣPPR | ΣNPR | ΣPPR/|ΣNPR| | IN12/f | IN67/f |
|---|---|---|---|---|---|
| 0.3495 | 1.3510 | 0.6327 | 2.1352 | 2.8858 | 0.0451 |

| |f1/f2| | |f2/f3| | (TP1 + IN12)/TP2 | | (TP7 + IN67)/TP6 | |
|---|---|---|---|---|---|
| 0.1271 | 2.2599 | 3.7428 | | 1.0296 | |

| HOS | InTL | HOS/HOI | InS/HOS | ODT % | TDT % |
|---|---|---|---|---|---|
| 81.6178 | 70.9539 | 13.6030 | 0.3451 | −113.2790 | 84.4806 |

| HVT11 | HVT12 | HVT21 | HVT22 | HVT31 | HVT32 |
|---|---|---|---|---|---|
| 0.0000 | 0.0000 | 0.0000 | 0.0000 | 0.0000 | 0.0000 |

| HVT61 | HVT62 | HVT71 | HVT72 | HVT72/HOI | HVT72/HOS |
|---|---|---|---|---|---|
| 0.0000 | 0.0000 | 0.0000 | 0.0000 | 0.0000 | 0.0000 |

| PhiA | PhiC | PhiD | TH1 | TH2 | HOI |
|---|---|---|---|---|---|
| 11.962 mm | 12.362 mm | 12.862 mm | 0.25 mm | 0.2 mm | 6 mm |

| PhiA/PhiD | TH1 + TH2 | (TH1 + TH2)/HOI | (TH1 + TH2)/HOS | 2(TH1 + TH2)/PhiA | InTL/HOS |
|---|---|---|---|---|---|
| 0.9676 | 0.45 mm | 0.075 | 0.0055 | 0.0752 | 0.8693 |

| PSTA | PLTA | NSTA | NLTA | SSTA | SLTA |
|---|---|---|---|---|---|
| 0.060 mm | −0.005 mm | 0.016 mm | 0.006 mm | 0.020 mm | −0.008 mm |

The values stated as follows may be deduced according to Table 3 and Table 4.

The second optical embodiment (Primary reference wavelength: 555 nm)

| | ARE | ½(HEP) | ARE value | ARE − ½(HEP) | 2(ARE/HEP) % | TP | ARE/TP (%) |
|---|---|---|---|---|---|---|---|
| 11 | 1.082 | 1.081 | −0.00075 | 99.93% | 4.977 | 21.72% |
| 12 | 1.082 | 1.083 | 0.00149 | 100.14% | 4.977 | 21.77% |
| 21 | 1.082 | 1.082 | 0.00011 | 100.01% | 5.000 | 21.64% |
| 22 | 1.082 | 1.082 | −0.00034 | 99.97% | 5.000 | 21.63% |
| 31 | 1.082 | 1.081 | −0.00084 | 99.92% | 5.000 | 21.62% |
| 32 | 1.082 | 1.081 | −0.00075 | 99.93% | 5.000 | 21.62% |
| 41 | 1.082 | 1.081 | −0.00059 | 99.95% | 4.095 | 26.41% |
| 42 | 1.082 | 1.081 | −0.00067 | 99.94% | 4.095 | 26.40% |
| 51 | 1.082 | 1.082 | −0.00021 | 99.98% | 1.539 | 70.28% |
| 52 | 1.082 | 1.081 | −0.00069 | 99.94% | 1.539 | 70.25% |
| 61 | 1.082 | 1.082 | −0.00021 | 99.98% | 5.000 | 21.63% |

-continued

| The second optical embodiment (Primary reference wavelength: 555 nm) | | | | | | |
|---|---|---|---|---|---|---|
| 62 | 1.082 | 1.082 | 0.00005 | 100.00% | 5.000 | 21.64% |
| 71 | 1.082 | 1.082 | −0.00003 | 100.00% | 4.933 | 21.93% |
| 72 | 1.082 | 1.083 | 0.00083 | 100.08% | 4.933 | 21.95% |

| ARS | EHD | ARS value | ARS − EHD | (ARS/ EHD)% | TP | ARS/ TP (%) |
|---|---|---|---|---|---|---|
| 11 | 20.767 | 21.486 | 0.719 | 103.46% | 4.977 | 431.68% |
| 12 | 9.412 | 13.474 | 4.062 | 143.16% | 4.977 | 270.71% |
| 21 | 8.636 | 9.212 | 0.577 | 106.68% | 5.000 | 184.25% |
| 22 | 9.838 | 10.264 | 0.426 | 104.33% | 5.000 | 205.27% |
| 31 | 8.770 | 8.772 | 0.003 | 100.03% | 5.000 | 175.45% |
| 32 | 8.511 | 8.558 | 0.047 | 100.55% | 5.000 | 171.16% |
| 41 | 4.600 | 4.619 | 0.019 | 100.42% | 4.095 | 112.80% |
| 42 | 4.965 | 4.981 | 0.016 | 100.32% | 4.095 | 121.64% |
| 51 | 5.075 | 5.143 | 0.067 | 101.33% | 1.539 | 334.15% |
| 52 | 5.047 | 5.062 | 0.015 | 100.30% | 1.539 | 328.89% |
| 61 | 5.011 | 5.075 | 0.064 | 101.28% | 5.000 | 101.50% |
| 62 | 5.373 | 5.489 | 0.116 | 102.16% | 5.000 | 109.79% |
| 71 | 5.513 | 5.625 | 0.112 | 102.04% | 4.933 | 114.03% |
| 72 | 5.981 | 6.307 | 0.326 | 105.44% | 4.933 | 127.84% |

The values stated as follows may be deduced according to Table 3 and Table 4.

| Related inflection point values of second optical embodiment (Primary reference wavelength: 555 nm) | | | | | | | |
|---|---|---|---|---|---|---|---|
| HIF111 | 0 | HIF111/HOI | 0 | SGI111 | 0 | \|SGI111\|/(\|SGI111\| + TP1) | 0 |

The Third Optical Embodiment

Figure 10:
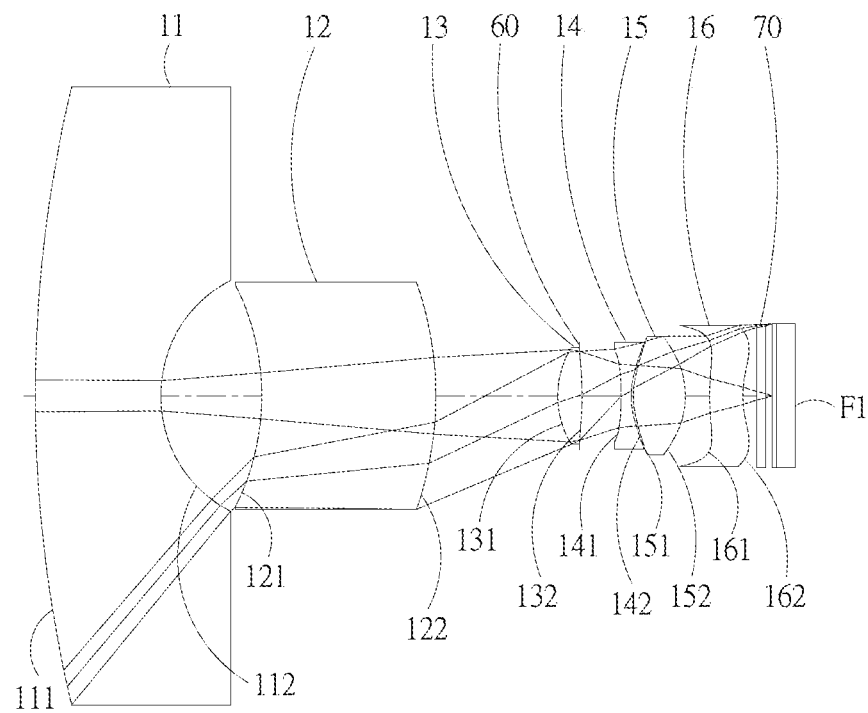
FIG. 10 depicts a configuration diagram of the camera lens of the automobile identification system according to the third optical embodiment of the present invention.

As shown in FIG. 10, the camera lens includes six lenses with refractive power, which are a first lens 11, a second lens 12, a third lens 13, a four lens 14, a fifth lens 15, and a sixth lens 16 sequentially displayed from an object side to an image side.

Figure 11:
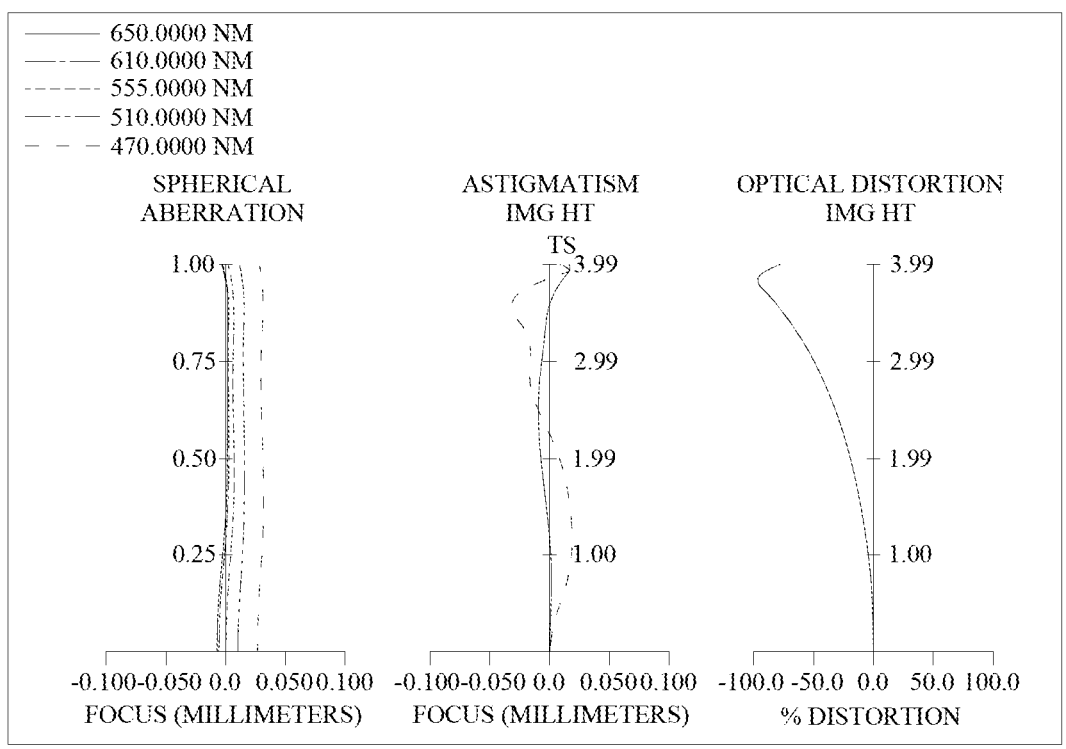
FIG. 11 depicts a curve diagram of the spherical aberration, astigmatism, and optical distortion illustrated sequentially from the left to the right according to the third optical embodiment of the present invention.

Please refer to FIG. 10 and FIG. 11. FIG. 10 depicts a configuration diagram of the camera lens of the automobile identification system according to the third optical embodiment of the present invention. FIG. 11 depicts a curve diagram of the spherical aberration, astigmatism, and optical distortion illustrated sequentially from the left to the right according to the third optical embodiment of the present invention. As shown in FIG. 10, the camera lens includes a first lens 11, a second lens 12, a third lens 13, an aperture 60, a four lens 14, a fifth lens 15, a sixth lens 16, an IR-cut filter 70, an image plane, and a first fingerprint sensor F1 or a second fingerprint sensor F2 sequentially displayed from an object side to an image side.

The first lens 11 has negative refractive power and is made of a glass material. The object side surface 111 thereof is a convex surface and the image side surface 112 thereof is a concave surface, both of which are spherical.

The second lens 12 has negative refractive power and is made of a glass material. The object side surface thereof 121 is a concave surface and the image side surface thereof 122 is a convex surface, both of which are spherical.

The third lens 13 has positive refractive power and is made of a glass material. The object side surface 131 thereof is a convex surface and the image side surface 132 thereof is a convex surface, both of which are aspheric. The object side surface 334 thereof has an inflection point.

The fourth lens 14 has negative refractive power and is made of a plastic material. The object side surface thereof 141 is a concave surface and the image side surface thereof 142 is a concave surface, both of which are aspheric. The image side surface 142 thereof both have an inflection point.

The fifth lens 15 has positive refractive power and is made of a plastic material. The object side surface 151 thereof is a convex surface and the image side surface 152 thereof is a convex surface, both of which are aspheric.

The sixth lens 16 has negative refractive power and is made of a plastic material. The object side surface 161 thereof is a convex surface and the image side surface 162 thereof is a concave surface. The object side surface 161 and the image side surface 162 thereof both have an inflection point. Therefore, it is advantageous for the lens to reduce the back focal length to maintain minimization. In addition, it is effective to suppress the incident angle with incoming light from an off-axis view field and further correct the aberration in the off-axis view field.

The IR-cut filter 70 is made of glass and is disposed between the sixth lens 16 and the first fingerprint sensor F1, which does not affect the focal length of the camera lens.

Please refer to the following Table 5 and Table 6.

TABLE 5

Data of the camera lens of the third optical embodiment
f = 2.808 mm; f/HEP = 1.6; HAF = 100 deg

| Surface | | Curvature radius | Thickness (mm) | Material |
|---|---|---|---|---|
| 0 | Object | 1E+18 | 1E+18 | |
| 1 | Lens 1 | 71.398124 | 7.214 | Glass |
| 2 | | 7.117272355 | 5.788 | |
| 3 | Lens 2 | −13.29213699 | 10.000 | Glass |
| 4 | | −18.37509887 | 7.005 | |
| 5 | Lens 3 | 5.039114804 | 1.398 | Plastic |
| 6 | | −15.53136631 | −0.140 | |
| 7 | Aperture | 1E+18 | 2.378 | |
| 8 | Lens 4 | −18.68613609 | 0.577 | Plastic |
| 9 | | 4.086545927 | 0.141 | |
| 10 | Lens 5 | 4.927609282 | 2.974 | Plastic |
| 11 | | −4.551946605 | 1.389 | |
| 12 | Lens 6 | 9.184876531 | 1.916 | Plastic |
| 13 | | 4.845500046 | 0.800 | |
| 14 | IR-cut filter | 1E+18 | 0.500 | BK_7 |
| 15 | | 1E+18 | 0.371 | |
| 16 | image plane | 1E+18 | 0.005 | |

| Surface | Refractive Index | Dispersion coefficient | Focal length |
|---|---|---|---|
| 0 | | | |
| 1 | 1.702 | 41.15 | −11.765 |
| 2 | | | |
| 3 | 2.003 | 19.32 | −4537.460 |
| 4 | | | |
| 5 | 1.514 | 56.80 | 7.553 |
| 6 | | | |
| 7 | | | |
| 8 | 1.661 | 20.40 | −4.978 |
| 9 | | | |
| 10 | 1.565 | 58.00 | 4.709 |
| 11 | | | |
| 12 | 1.514 | 56.80 | −23.405 |
| 13 | | | |

TABLE 5-continued

Data of the camera lens of the third optical embodiment
f = 2.808 mm; f/HEP = 1.6; HAF = 100 deg

| | | | |
|---|---|---|---|
| 14 | 1.517 | 64.13 | 5 |
| 15 | | | |
| 16 | | | |

Reference wavelength (d-line) = 555 nm

TABLE 6

The aspheric surface parameters of the third optical embodiment
Aspheric Coefficients

| Surface No | 1 | 2 | 3 | 4 |
|---|---|---|---|---|
| k  | 0.000000E+00 | 0.000000E+00 | 0.000000E+00 | 0.000000E+00 |
| A4 | 0.000000E+00 | 0.000000E+00 | 0.000000E+00 | 0.000000E+00 |
| A6 | 0.000000E+00 | 0.000000E+00 | 0.000000E+00 | 0.000000E+00 |
| A8 | 0.000000E+00 | 0.000000E+00 | 0.000000E+00 | 0.000000E+00 |
| A10| 0.000000E+00 | 0.000000E+00 | 0.000000E+00 | 0.000000E+00 |

| Surface No | 5 | 6 | 8 | 9 |
|---|---|---|---|---|
| k  | 1.318519E−01  | 3.120384E+00  | −1.494442E+01 | 2.744228E−02  |
| A4 | 6.405246E−05  | 2.103942E−03  | −1.598286E−03 | −7.291825E−03 |
| A6 | 2.278341E−05  | −1.050629E−04 | −9.177115E−04 | 9.730714E−05  |
| A8 | −3.672908E−06 | 6.168906E−06  | 1.011405E−04  | 1.101816E−06  |
| A10| 3.748457E−07  | −1.224682E−07 | −4.919835E−06 | −6.849076E−07 |

| Surface No | 10 | 11 | 12 | 13 |
|---|---|---|---|---|
| k  | −7.864013E+00 | −2.263702E+00 | −4.206923E+01 | −7.030803E+00 |
| A4 | 1.405243E−04  | −3.919567E−03 | −1.679499E−03 | −2.640099E−03 |
| A6 | 1.837602E−04  | 2.683449E−04  | −3.518520E−04 | −4.507651E−05 |
| A8 | −2.173368E−05 | −1.229452E−05 | 5.047353E−05  | −2.600391E−05 |
| A10| 7.328496E−07  | 4.222621E−07  | −3.851055E−06 | 1.161811E−06  |

In the third optical embodiment, the aspheric surface formula is presented in the same way in the first optical embodiment. In addition, the definitions of parameters in following tables are the same as those in the first optical embodiment. Therefore, similar description shall not be illustrated again.

The values stated as follows may be deduced according to Table 5 and Table 6.

| Third optical embodiment (Primary reference wavelength: 555 nm) | | | | | |
|---|---|---|---|---|---|
| |f/f1| | |f/f2| | |f/f3| | |f/f4| | |f/f5| | |f/f6| |
| 0.23865 | 0.00062 | 0.37172 | 0.56396 | 0.59621 | 0.11996 |
| ΣPPR | ΣNPR | ΣPPR/|ΣNPR| | IN12/f | IN56/f | TP4/(IN34 + TP4 + IN45) |
| 1.77054 | 0.12058 | 14.68400 | 2.06169 | 0.49464 | 0.19512 |
| |f1/f2| | |f2/f3| | (TP1 + IN12)/TP2 | | (TP6 + IN56)/TP5 | |
| 0.00259 | 600.74778 | 1.30023 | | 1.11131 | |
| HOS | InTL | HOS/HOI | InS/HOS | ODT % | TDT % |
| 42.31580 | 40.63970 | 10.57895 | 0.26115 | −122.32700 | 93.33510 |
| HVT51 | HVT52 | HVT61 | HVT62 | HVT62/HOI | HVT62/HOS |
| 0 | 0 | 2.22299 | 2.60561 | 0.65140 | 0.06158 |
| TP2/TP3 | TP3/TP4 | InRS61 | InRS62 | |InRS61|/TP6 | |InRS62|/TP6 |
| 7.15374 | 2.42321 | −0.20807 | −0.24978 | 0.10861 | 0.13038 |
| PhiA | PhiC | PhiD | TH1 | TH2 | HOI |
| 6.150 mm | 6.41 mm | 6.71 mm | 0.15 mm | 0.13 mm | 4 mm |

-continued

Third optical embodiment (Primary reference wavelength: 555 nm)

| PhiA/PhiD | TH1 + TH2 | (TH1 + TH2)/HOI | (TH1 + TH2)/HOS | 2(TH1 + TH2)/PhiA | InTL/HOS |
|---|---|---|---|---|---|
| 0.9165 | 0.28 mm | 0.07 | 0.0066 | 0.0911 | 0.9604 |

| PSTA | PLTA | NSTA | NLTA | SSTA | SLTA |
|---|---|---|---|---|---|
| 0.014 mm | 0.002 mm | −0.003 mm | −0.002 mm | 0.011 mm | −0.001 mm |

The values related to arc lengths may be obtained according to Table 5 and Table 6.

Third optical embodiment (Reference wavelength = 555 nm)

| ARE | ½(HEP) | ARE value | ARE − ½(HEP) | 2(ARE/HEP) % | TP | ARE/TP (%) |
|---|---|---|---|---|---|---|
| 11 | 0.877 | 0.877 | −0.00036 | 99.96% | 7.214 | 12.16% |
| 12 | 0.877 | 0.879 | 0.00186 | 100.21% | 7.214 | 12.19% |
| 21 | 0.877 | 0.878 | 0.00026 | 100.03% | 10.000 | 8.78% |
| 22 | 0.877 | 0.877 | −0.00004 | 100.00% | 10.000 | 8.77% |
| 31 | 0.877 | 0.882 | 0.00413 | 100.47% | 1.398 | 63.06% |
| 32 | 0.877 | 0.877 | 0.00004 | 100.00% | 1.398 | 62.77% |
| 41 | 0.877 | 0.877 | −0.00001 | 100.00% | 0.577 | 152.09% |
| 42 | 0.877 | 0.883 | 0.00579 | 100.66% | 0.577 | 153.10% |
| 51 | 0.877 | 0.881 | 0.00373 | 100.43% | 2.974 | 29.63% |
| 52 | 0.877 | 0.883 | 0.00521 | 100.59% | 2.974 | 29.68% |
| 61 | 0.877 | 0.878 | 0.00064 | 100.07% | 1.916 | 45.83% |
| 62 | 0.877 | 0.881 | 0.00368 | 100.42% | 1.916 | 45.99% |

| ARS | EHD | ARS value | ARS − EHD | (ARS/EHD)% | TP | ARS/TP (%) |
|---|---|---|---|---|---|---|
| 11 | 17.443 | 17.620 | 0.178 | 101.02% | 7.214 | 244.25% |
| 12 | 6.428 | 8.019 | 1.592 | 124.76% | 7.214 | 111.16% |
| 21 | 6.318 | 6.584 | 0.266 | 104.20% | 10.000 | 65.84% |
| 22 | 6.340 | 6.472 | 0.132 | 102.08% | 10.000 | 64.72% |
| 31 | 2.699 | 2.857 | 0.158 | 105.84% | 1.398 | 204.38% |
| 32 | 2.476 | 2.481 | 0.005 | 100.18% | 1.398 | 177.46% |
| 41 | 2.601 | 2.652 | 0.051 | 101.96% | 0.577 | 459.78% |
| 42 | 3.006 | 3.119 | 0.113 | 103.75% | 0.577 | 540.61% |
| 51 | 3.075 | 3.171 | 0.096 | 103.13% | 2.974 | 106.65% |
| 52 | 3.317 | 3.624 | 0.307 | 109.24% | 2.974 | 121.88% |
| 61 | 3.331 | 3.427 | 0.095 | 102.86% | 1.916 | 178.88% |
| 62 | 3.944 | 4.160 | 0.215 | 105.46% | 1.916 | 217.14% |

The values stated as follows may be deduced according to Table 5 and Table 6.

Related inflection point values of third optical embodiment (Primary reference wavelength: 555 nm)

| HIF321 | 2.0367 | HIF321/HOI | 0.5092 | SGI321 | −0.1056 | |SGI321|/(|SGI321| + TP3) | 0.0702 |
|---|---|---|---|---|---|---|---|
| HIF421 | 2.4635 | HIF421/HOI | 0.6159 | SGI421 | 0.5780 | |SGI421|/(|SGI421| + TP4) | 0.5005 |
| HIF611 | 1.2364 | HIF611/HOI | 0.3091 | SGI611 | 0.0668 | |SGI611|/(|SGI611| + TP6) | 0.0337 |
| HIF621 | 1.5488 | HIF621/HOI | 0.3872 | SGI621 | 0.2014 | |SGI621|/(|SGI621| + TP6) | 0.0951 |

The Fourth Optical Embodiment

Figure 12:
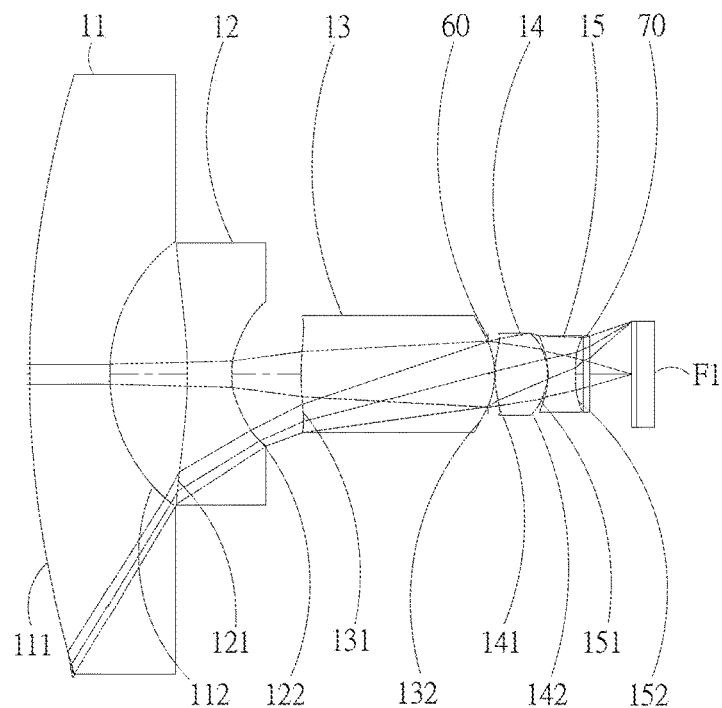
FIG. 12 depicts a configuration diagram of the camera lens of the automobile identification system according to the fourth optical embodiment of the present invention.

As shown in FIG. 12, the camera lens may include five lenses with refractive power, which are a first lens 11, a second lens 12, a third lens 13, a four lens 14, a fifth lens 15 sequentially displayed from an object side to an image side.

Figure 13:
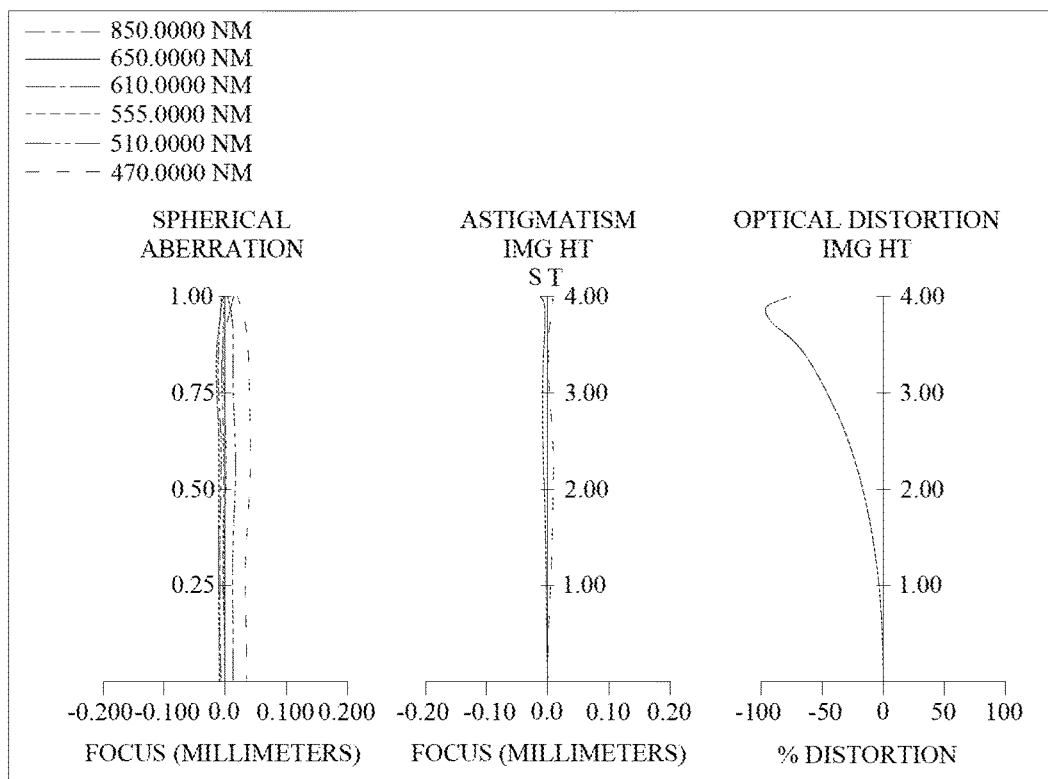
FIG. 13 depicts a curve diagram of the spherical aberration, astigmatism, and optical distortion illustrated sequentially from the left to the right according to the fourth optical embodiment of the present invention.

Please refer to FIG. 12 and FIG. 13. FIG. 12 depicts a configuration diagram of the camera lens of the automobile identification system according to the fourth optical embodiment of the present invention. FIG. 13 depicts a curve diagram of the spherical aberration, astigmatism, and optical distortion illustrated sequentially from the left to the right according to the fourth optical embodiment of the present invention. As shown in FIG. 12, the camera lens includes a first lens 11, a second lens 12, a third lens 13, an aperture 60, a four lens 14, a fifth lens 15, a sixth lens 16, an IR-cut filter 70, an image plane, and a first fingerprint sensor F1 or a second fingerprint sensor F2 sequentially displayed from an object side to an image side.

The first lens 11 has negative refractive power and is made of a glass material. The object side surface 111 thereof is a convex surface and the image side surface 112 thereof is a concave surface, both of which are spherical.

The second lens 12 has negative refractive power and is made of a plastic material. The object side surface thereof 121 is a concave surface and the image side surface thereof 122 is a concave surface, both of which are aspheric. The object side surface 121 has an inflection point.

The third lens 13 has positive refractive power and is made of a plastic material. The object side surface 131 thereof is a convex surface and the image side surface 132 thereof is a convex surface, both of which are aspheric. The object side surface 131 thereof has an inflection point.

The fourth lens 14 has positive refractive power and is made of a plastic material. The object side surface 141 thereof is a convex surface and the image side surface 142 thereof is a concave surface, both of which are aspheric. The object side surface 141 thereof has an inflection point.

The fifth lens 15 has negative refractive power and is made of a plastic material. The object side surface thereof 151 is a concave surface and the image side surface thereof 152 is a concave surface, both of which are aspheric. The object side surface 151 has two inflection points. Therefore, it is advantageous for the lens to reduce the back focal length to maintain minimization.

The IR-cut filter 70 is made of glass and is disposed between the fifth lens 15 and the first fingerprint sensor F1, which does not affect the focal length of the camera lens.

Please refer to the following Table 7 and Table 8.

TABLE 7

Data of the camera lens of the fourth optical embodiment
f = 2.7883 mm; f/HEP = 1.8; HAF = 101 deg

| Surface | | Curvature radius | Thickness(mm) | Material |
|---|---|---|---|---|
| 0 | Object | 1E+18 | 1E+18 | |
| 1 | Lens 1 | 76.84219 | 6.117399 | Glass |
| 2 | | 12.62555 | 5.924382 | |
| 3 | Lens 2 | −37.0327 | 3.429817 | Plastic |

TABLE 7-continued

Data of the camera lens of the fourth optical embodiment
f = 2.7883 mm; f/HEP = 1.8; HAF = 101 deg

| | | | | |
|---|---|---|---|---|
| 4 | | 5.88556 | 5.305191 | |
| 5 | Lens 3 | 17.99395 | 14.79391 | |
| 6 | | −5.76903 | −0.4855 | Plastic |
| 7 | Aperture | 1E+18 | 0.535498 | |
| 8 | Lens 4 | 8.19404 | 4.011739 | Plastic |
| 9 | | −3.84363 | 0.050366 | |
| 10 | Lens 5 | −4.34991 | 2.088275 | Plastic |
| 11 | | 16.6609 | 0.6 | |
| 12 | IR-cut filter | 1E+18 | 0.5 | BK_7 |
| 13 | | 1E+18 | 3.254927 | |
| 14 | Image plane | 1E+18 | −0.00013 | |

| Surface | Refractive index | Dispersion coefficient | Focal length |
|---|---|---|---|
| 0 | | | |
| 1 | 1.497 | 81.61 | −31.322 |
| 2 | | | |
| 3 | 1.565 | 54.5 | −8.70843 |
| 4 | | | |
| 5 | | | |
| 6 | 1.565 | 58 | 9.94787 |
| 7 | | | |
| 8 | 1.565 | 58 | 5.24898 |
| 9 | | | |
| 10 | 1.661 | 20.4 | −4.97515 |
| 11 | | | |
| 12 | 1.517 | 64.13 | |
| 13 | | | |
| 14 | | | |

Reference wavelength(d-line) = 555 nm

TABLE 8

The aspheric surface parameters of the fourth optical embodiment
Aspheric Coefficients

| Surface | 1 | 2 | 3 | 4 |
|---|---|---|---|---|
| k | 0.000000E+00 | 0.000000E+00 | 0.131249 | −0.069541 |
| A4 | 0.000000E+00 | 0.000000E+00 | 3.99823E−05 | −8.55712E−04 |
| A6 | 0.000000E+00 | 0.000000E+00 | 9.03636E−08 | −1.96175E−06 |
| A8 | 0.000000E+00 | 0.000000E+00 | 1.91025E−09 | −1.39344E−08 |
| A10 | 0.000000E+00 | 0.000000E+00 | −1.18567E−11 | −4.17090E−09 |
| A12 | 0.000000E+00 | 0.000000E+00 | 0.000000E+00 | 0.000000E+00 |

| Surface | 5 | 6 | 8 | 9 |
|---|---|---|---|---|
| k | −0.324555 | 0.009216 | −0.292346 | −0.18604 |
| A4 | −9.07093E−04 | 8.80963E−04 | −1.02138E−03 | 4.33629E−03 |
| A6 | −1.02465E−05 | 3.14497E−05 | −1.18559E−04 | −2.91588E−04 |
| A8 | −8.18157E−08 | −3.15863E−06 | 1.34404E−05 | 9.11419E−06 |
| A10 | −2.42621E−09 | 1.44613E−07 | −2.80681E−06 | 1.28365E−07 |
| A12 | 0.000000E+00 | 0.000000E+00 | 0.000000E+00 | 0.000000E+00 |

| Surface | 10 | 11 |
|---|---|---|
| k | −6.17195 | 27.541383 |
| A4 | 1.58379E−03 | 7.56932E−03 |
| A6 | −1.81549E−04 | −7.83858E−04 |
| A8 | −1.18213E−05 | 4.79120E−05 |
| A10 | 1.92716E−06 | −1.73591E−06 |
| A12 | 0.000000E+00 | 0.000000E+00 |

In the fourth optical embodiment, the aspheric surface formula is presented in the same way in the first optical embodiment. In addition, the definitions of parameters in following tables are the same as those in the first optical embodiment. Therefore, similar description shall not be illustrated again.

The values stated as follows may be deduced according to Table 7 and Table 8.

Fourth optical embodiment (Primary reference wavelength: 555 nm)

| |f/f1| | |f/f2| | |f/f3| | |f/f4| | |f/f5| | |f1/f2| |
|---|---|---|---|---|---|
| 0.08902 | 0.32019 | 0.28029 | 0.53121 | 0.56045 | 3.59674 |

| ΣPPR | ΣNPR | ΣPPR/|ΣNPR| | IN12/f | IN45/f | |f2/f3| |
|---|---|---|---|---|---|
| 1.4118 | 0.3693 | 3.8229 | 2.1247 | 0.0181 | 0.8754 |

| Fourth optical embodiment (Primary reference wavelength: 555 nm) | | | | | |
|---|---|---|---|---|---|
| TP3/(IN23 + TP3 + IN34) | | (TP1 + IN12)/TP2 | | (TP5 + IN45)/TP4 | |
| 0.73422 | | 3.51091 | | 0.53309 | |
| HOS | InTL | HOS/HOI | InS/HOS | ODT % | TDT % |
| 46.12590 | 41.77110 | 11.53148 | 0.23936 | −125.266 | 99.1671 |
| HVT41 | HVT42 | HVT51 | HVT52 | HVT52/HOI | HVT52/HOS |
| 0.00000 | 0.00000 | 0.00000 | 0.00000 | 0.00000 | 0.00000 |
| TP2/TP3 | TP3/TP4 | InRS51 | InRS52 | \|InRS51\|/TP5 | \|InRS52\|/TP5 |
| 0.23184 | 3.68765 | −0.679265 | 0.5369 | 0.32528 | 0.25710 |
| PhiA | PhiC | PhiD | TH1 | TH2 | HOI |
| 5.598 mm | 5.858 mm | 6.118 mm | 0.13 mm | 0.13 mm | 4 mm |
| PhiA/PhiD | TH1 + TH2 | (TH1 + TH2)/HOI | (TH1 + TH2)/HOS | 2(TH1 + TH2)/PhiA | InTL/HOS |
| 0.9150 | 0.26 mm | 0.065 | 0.0056 | 0.0929 | 0.9056 |
| PSTA | PLTA | NSTA | NLTA | SSTA | SLTA |
| −0.011 mm | 0.005 mm | −0.010 mm | −0.003 mm | 0.005 mm | −0.00026 mm |

The values related to arc lengths may be obtained according to table 7 and table 8.

| Fourth optical embodiment (Reference wavelength = 555 nm) | | | | | |
|---|---|---|---|---|---|
| ARE | ½(HEP) | ARE value | ARE − ½(HEP) | 2(ARE/HEP) % | TP | ARE/TP (%) |
| 11 | 0.775 | 0.774 | −0.00052 | 99.93% | 6.117 | 12.65% |
| 12 | 0.775 | 0.774 | −0.00005 | 99.99% | 6.117 | 12.66% |
| 21 | 0.775 | 0.774 | −0.00048 | 99.94% | 3.430 | 22.57% |
| 22 | 0.775 | 0.776 | 0.00168 | 100.22% | 3.430 | 22.63% |
| 31 | 0.775 | 0.774 | −0.00031 | 99.96% | 14.794 | 5.23% |
| 32 | 0.775 | 0.776 | 0.00177 | 100.23% | 14.794 | 5.25% |
| 41 | 0.775 | 0.775 | 0.00059 | 100.08% | 4.012 | 19.32% |
| 42 | 0.775 | 0.779 | 0.00453 | 100.59% | 4.012 | 19.42% |
| 51 | 0.775 | 0.778 | 0.00311 | 100.40% | 2.088 | 37.24% |
| 52 | 0.775 | 0.774 | −0.00014 | 99.98% | 2.088 | 37.08% |

| Fourth optical embodiment (Reference wavelength = 555 nm) | | | | | | |
|---|---|---|---|---|---|---|
| ARS | ARS | EHD | ARS value | ARS − EHD | (ARS/EHD)% | TP | ARS/TP (%) |
| 11 | 23.038 | 23.397 | 0.359 | 101.56% | 6.117 | 382.46% |
| 12 | 10.140 | 11.772 | 1.632 | 116.10% | 6.117 | 192.44% |
| 21 | 10.138 | 10.178 | 0.039 | 100.39% | 3.430 | 296.74% |
| 22 | 5.537 | 6.337 | 0.800 | 114.44% | 3.430 | 184.76% |
| 31 | 4.490 | 4.502 | 0.012 | 100.27% | 14.794 | 30.43% |
| 32 | 2.544 | 2.620 | 0.076 | 102.97% | 14.794 | 17.71% |
| 41 | 2.735 | 2.759 | 0.024 | 100.89% | 4.012 | 68.77% |
| 42 | 3.123 | 3.449 | 0.326 | 110.43% | 4.012 | 85.97% |
| 51 | 2.934 | 3.023 | 0.089 | 103.04% | 2.088 | 144.74% |
| 52 | 2.799 | 2.883 | 0.084 | 103.00% | 2.088 | 138.08% |

The values stated as follows may be deduced according to Table 7 and Table 8.

| Related inflection point values of fourth optical embodiment (Primary reference wavelength: 555 nm) | | | | | |
|---|---|---|---|---|---|
| HIF211 | 6.3902 | HIF211/HOI | 1.5976 | SGI211 | −0.4793 | \|SGI211\|/(\|SGI211\| + TP2) | 0.1226 |
| HIF311 | 2.1324 | HIF311/HOI | 0.5331 | SGI311 | 0.1069 | \|SGI311\|/(\|SGI311\| + TP3) | 0.0072 |
| HIF411 | 2.0278 | HIF411/HOI | 0.5070 | SGI411 | 0.2287 | \|SGI411\|/(\|SGI411\| + TP4) | 0.0539 |
| HIF511 | 2.6253 | HIF511/HOI | 0.6563 | SGI511 | −0.5681 | \|SGI511\|/(\|SGI511\| + TP5) | 0.2139 |
| HIF512 | 2.1521 | HIF512/HOI | 0.5380 | SGI512 | −0.8314 | \|SGI512\|/(\|SGI512\| + TP5) | 0.2848 |

The Fifth Optical Embodiment

Figure 14:
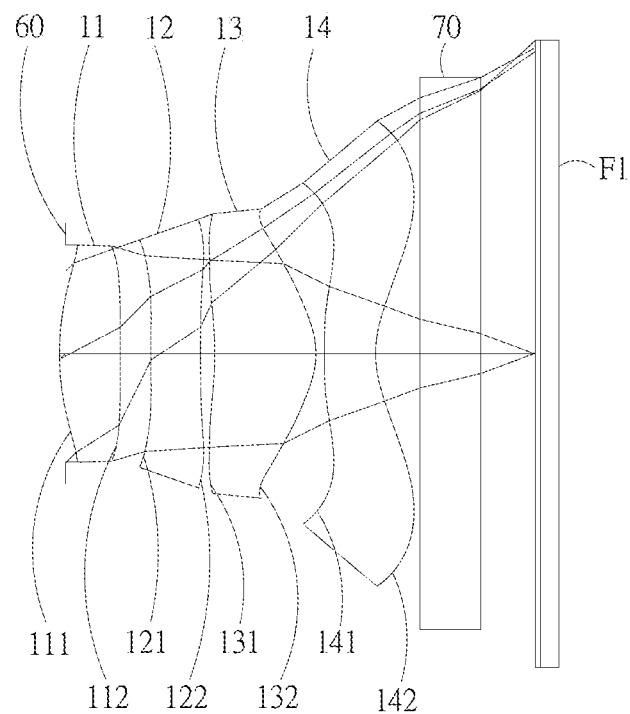
FIG. 14 depicts a configuration diagram of the camera lens of the automobile identification system according to the fifth optical embodiment of the present invention.

As shown in FIG. 14, the camera lens includes fourth lenses with refractive power, which are a first lens 11, a second lens 12, a third lens 13, and a four lens 14 sequentially displayed from an object side to an image side.

Figure 15:
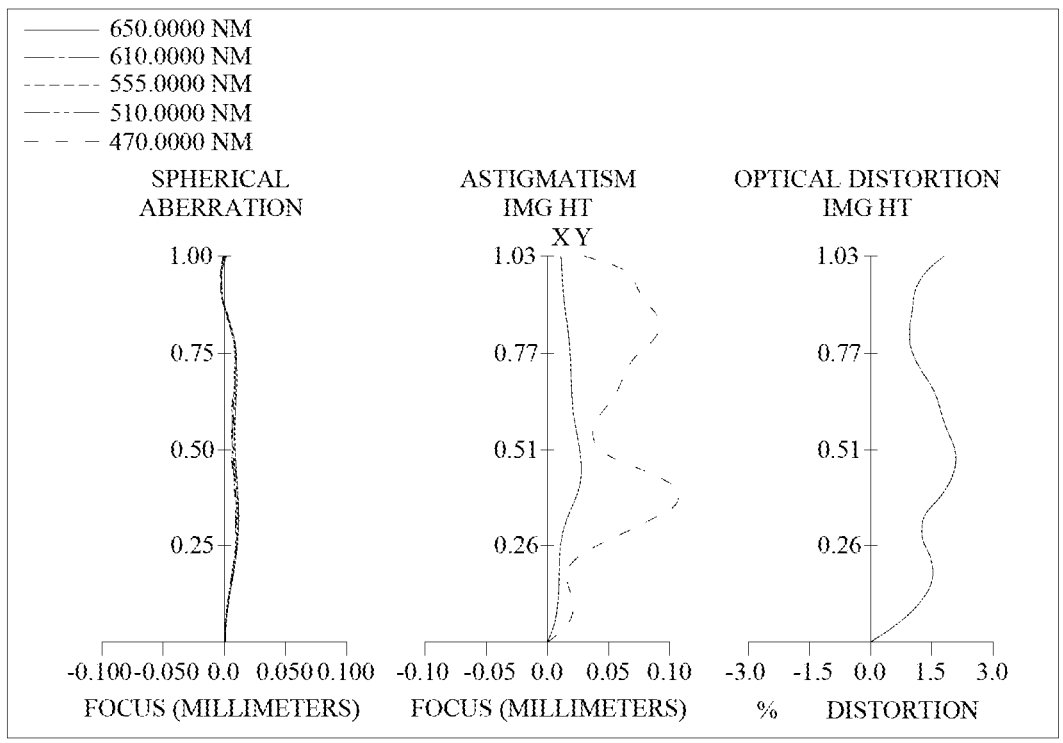
FIG. 15 depicts a curve diagram of the spherical aberration, astigmatism, and optical distortion illustrated sequentially from the left to the right according to the fifth optical embodiment of the present invention.

Please refer to FIG. 14 and FIG. 15. FIG. 14 depicts a configuration diagram of the camera lens of the automobile identification system according to the fifth optical embodiment of the present invention. FIG. 15 depicts a curve diagram of the spherical aberration, astigmatism, and optical distortion illustrated sequentially from the left to the right according to the fifth optical embodiment of the present invention. As shown in FIG. 14, the camera lens includes an aperture 60, a first lens 11, a second lens 12, a third lens 13, a four lens 14, an IR-cut filter 70, an image plane, and a first fingerprint sensor F1 or a second fingerprint sensor F2 sequentially displayed from an object side to an image side.

The first lens 11 has positive refractive power and is made of a plastic material. The object side surface 111 thereof is a convex surface and the image side surface 112 thereof is a convex surface, both of which are aspheric. The object side surface 111 thereof has an inflection point.

The second lens 12 has negative refractive power and is made of a plastic material. The object side surface thereof 121 is a convex surface and the image side surface thereof 122 is a concave surface, both of which are aspheric. The object side surface 121 has two inflection points and the image side surface 122 thereof has an inflection point.

The third lens 13 has positive refractive power and is made of a plastic material. The object side surface 131 thereof is a concave surface and the image side surface 132 thereof is a convex surface, both of which are aspheric. The object side surface 131 thereof has three inflection points and the image side surface 132 thereof has an inflection point.

The fourth lens 14 has negative refractive power and is made of a plastic material. The object side surface thereof 141 is a concave surface and the image side surface thereof 142 is a concave surface, both of which are aspheric. The object side surface thereof 141 has two inflection points and the image side surface 142 thereof has an inflection point.

The IR-cut filter 70 is made of glass and is disposed between the fourth lens 14 and the first fingerprint sensor F1, which does not affect the focal length of the camera lens.

Please refer to the following Table 9 and Table 10.

TABLE 9

Data of the camera lens of the fifth optical embodiment
f = 1.04102 mm; f/HEP = 1.4; HAF = 44.0346 deg

| Surface | | Curvature Radius | Thickness (mm) | Material |
|---|---|---|---|---|
| 0 | Object | 1E+18 | 600 | |
| 1 | Aperture | 1E+18 | −0.020 | |
| 2 | Lens 1 | 0.890166851 | 0.210 | Plastic |
| 3 | | −29.11040115 | −0.010 | |
| 4 | | 1E+18 | 0.116 | |
| 5 | Lens 2 | 10.67765398 | 0.170 | Plastic |
| 6 | | 4.977771922 | 0.049 | |
| 7 | Lens 3 | −1.191436932 | 0.349 | Plastic |
| 8 | | −0.248990674 | 0.030 | |
| 9 | Lens 4 | −38.08537212 | 0.176 | Plastic |
| 10 | | 0.372574476 | 0.152 | |
| 11 | IR-cut filter | 1E+18 | 0.210 | BK_7 |
| 12 | | 1E+18 | 0.185 | |
| 13 | Image plane | 1E+18 | 0.005 | |

| Surface | Refractive index | Dispersion coefficient | Focal length |
|---|---|---|---|
| 0 | | | |
| 1 | | | |
| 2 | 1.545 | 55.96 | 1.587 |
| 3 | | | |
| 4 | | | |
| 5 | 1.642 | 22.46 | −14.569 |
| 6 | | | |
| 7 | 1.545 | 55.96 | 0.510 |
| 8 | | | |
| 9 | 1.642 | 22.46 | −0.569 |
| 10 | | | |
| 11 | 1.517 | 64.13 | |
| 12 | | | |
| 13 | | | |

Reference wavelength (d-line) = 555 nm.
Shield position: The radius of the clear aperture of the fourth surface is 0.360 mm.

TABLE 10

The aspheric surface parameters of the fifth optical embodiment
Aspheric Coefficients

| Surface | 2 | 3 | 5 | 6 |
|---|---|---|---|---|
| k= | −1.106629E+00 | 2.994179E−07 | −7.788754E+01 | −3.440335E+01 |
| A4= | 8.291155E−01 | −6.401113E−01 | −4.958114E+00 | −1.875957E+00 |
| A6= | −2.398799E+01 | −1.265726E+01 | 1.299769E+02 | 8.568480E+01 |
| A8= | 1.825378E+02 | 8.457286E+01 | −2.736977E+03 | −1.279044E+03 |
| A10= | −6.211133E+02 | −2.157875E+02 | 2.908537E+04 | 8.661312E+03 |
| A12= | −4.719066E+02 | −6.203600E+02 | −1.499597E+05 | −2.875274E+04 |
| A14= | 0.000000E+00 | 0.000000E+00 | 2.992026E+05 | 3.764871E+04 |
| A16= | 0.000000E+00 | 0.000000E+00 | 0.000000E+00 | 0.000000E+00 |
| A18= | 0.000000E+00 | 0.000000E+00 | 0.000000E+00 | 0.000000E+00 |
| A20= | 0.000000E+00 | 0.000000E+00 | 0.000000E+00 | 0.000000E+00 |

| Surface | 7 | 8 | 9 | 10 |
|---|---|---|---|---|
| k= | −8.522097E−01 | −4.735945E+00 | −2.277155E+01 | −8.039778E−01 |
| A4= | −4.878227E−01 | −2.490377E+00 | 1.672704E+01 | −7.613206E+00 |
| A6= | 1.291242E+02 | 1.524149E+02 | −3.260722E+02 | 3.374046E+01 |
| A8= | −1.979689E+03 | −4.841033E+03 | 3.373231E+03 | −1.368453E+02 |
| A10= | 1.456076E+04 | 8.053747E+04 | −2.177676E+04 | 4.049486E+02 |
| A12= | −5.975920E+04 | −7.936887E+05 | 8.951687E+04 | −9.711797E+02 |
| A14= | 1.351676E+05 | 4.811528E+06 | −2.363737E+05 | 1.942574E+03 |

TABLE 10-continued

The aspheric surface parameters of the fifth optical embodiment
Aspheric Coefficients

| | | | | |
|---|---|---|---|---|
| A16= | −1.329001E+05 | −1.762293E+07 | 3.983151E+05 | −2.876356E+03 |
| A18= | 0.000000E+00 | 3.579891E+07 | −4.090689E+05 | 2.562386E+03 |
| A20= | 0.000000E+00 | −3.094006E+07 | 2.056724E+05 | −9.943657E+02 |

In the fifth optical embodiment, the aspheric surface formula is presented in the same way in the first optical embodiment. In addition, the definitions of parameters in following tables are the same as those in the first optical embodiment. Therefore, similar description shall not be illustrated again.

The values stated as follows may be deduced according to Table 9 and Table 10.

| Fifth optical embodiment (Primary reference wavelength: 555 nm) | | | | | |
|---|---|---|---|---|---|
| InRS41 | InRS42 | HVT41 | HVT42 | ODT % | TDT % |
| −0.07431 | 0.00475 | 0.00000 | 0.53450 | 2.09403 | 0.84704 |
| $\|f/f1\|$ | $\|f/f2\|$ | $\|f/f3\|$ | $\|f/f4\|$ | $\|f1/f2\|$ | $\|f2/f3\|$ |
| 0.65616 | 0.07145 | 2.04129 | 1.83056 | 0.10890 | 28.56826 |
| ΣPPR | ΣNPR | ΣPPR/\|ΣNPR\| | ΣPP | ΣNP | f1/ΣPP |
| 2.11274 | 2.48672 | 0.84961 | −14.05932 | 1.01785 | 1.03627 |
| f4/ΣNP | IN12/f | IN23/f | IN34/f | TP3/f | TP4/f |
| 1.55872 | 0.10215 | 0.04697 | 0.02882 | 0.33567 | 0.16952 |
| InTL | HOS | HOS/HOI | InS/HOS | InTL/HOS | ΣTP/InTL |
| 1.09131 | 1.64329 | 1.59853 | 0.98783 | 0.66410 | 0.83025 |
| (TP1 + IN12)/TP2 | (TP4 + IN34)/TP3 | TP1/TP2 | TP3/TP4 | IN23/(TP2 + IN23 + TP3) | |
| 1.86168 | 0.59088 | 1.23615 | 1.98009 | 0.08604 | |
| \|InRS41\|/TP4 | \|InRS42\|/TP4 | HVT42/HOI | HVT42/HOS | InTL/HOS | |
| 0.4211 | 0.0269 | 0.5199 | 0.3253 | 0.6641 | |
| PhiA | PhiC | PhiD | TH1 | TH2 | HOI |
| 1.596 mm | 1.996 mm | 2.396 mm | 0.2 mm | 0.2 mm | 1.028 mm |
| PhiA/PhiD | TH1 + TH2 | (TH1 + TH2)/HOI | (TH1 + TH2)/HOS | 2(TH1 + TH2)/PhiA | |
| 0.7996 | 0.4 mm | 0.3891 | 0.2434 | 0.5013 | |
| PSTA | PLTA | NSTA | NLTA | SSTA | SLTA |
| −0.029 mm | −0.023 mm | −0.011 mm | −0.024 mm | 0.010 mm | 0.011 mm |

The values stated as follows may be deduced according to Table 9 and Table 10.

| Related inflection point values of fifth optical embodiment (Primary reference wavelength: 555 nm) | | | | | | | |
|---|---|---|---|---|---|---|---|
| HIF111 | 0.28454 | HIF111/HOI | 0.27679 | SGI111 | 0.04361 | \|SGI111\|/(\|SGI111\| + TP1) | 0.17184 |
| HIF211 | 0.04198 | HIF211/HOI | 0.04083 | SGI211 | 0.00007 | \|SGI211\|/(\|SGI211\| + TP2) | 0.00040 |
| HIF212 | 0.37903 | HIF212/HOI | 0.36871 | SGI212 | −0.03682 | \|SGI212\|/(\|SGI212\| + TP2) | 0.17801 |
| HIF221 | 0.25058 | HIF221/HOI | 0.24376 | SGI221 | 0.00695 | \|SGI221\|/(\|SGI221\| + TP2) | 0.03927 |
| HIF311 | 0.14881 | HIF311/HOI | 0.14476 | SGI311 | −0.00854 | \|SGI311\|/(\|SGI311\| + TP3) | 0.02386 |
| HIF312 | 0.31992 | HIF312/HOI | 0.31120 | SGI312 | −0.01783 | \|SGI312\|/(\|SGI312\| + TP3) | 0.04855 |
| HIF313 | 0.32956 | HIF313/HOI | 0.32058 | SGI313 | −0.01801 | \|SGI313\|/(\|SGI313\| + TP3) | 0.04902 |
| HIF321 | 0.36943 | HIF321/HOI | 0.35937 | SGI321 | −0.14878 | \|SGI321\|/(\|SGI321\| + TP3) | 0.29862 |

-continued

| Related inflection point values of fifth optical embodiment (Primary reference wavelength: 555 nm) | | | | | | |
|---|---|---|---|---|---|---|
| HIF411 | 0.01147 | HIF411/HOI | 0.01116 | SGI411 | −0.00000 | \|SGI411\|/(\|SGI411\| + TP4) | 0.00001 |
| HIF412 | 0.22405 | HIF412/HOI | 0.21795 | SGI412 | 0.01598 | \|SGI412\|/(\|SGI412\| + TP4) | 0.08304 |
| HIF421 | 0.24105 | HIF421/HOI | 0.23448 | SGI421 | 0.05924 | \|SGI421\|/(\|SGI421\| + TP4) | 0.25131 |

The values related to arc lengths may be obtained according to table 9 and table 10.

| Fifth optical embodiment (Reference wavelength = 555 nm) | | | | | | |
|---|---|---|---|---|---|---|
| ARE | ½(HEP) | ARE value | ARE − ½(HEP) | 2(ARE/ HEP) % | TP | ARE/ TP (%) |
| 11 | 0.368 | 0.374 | 0.00578 | 101.57% | 0.210 | 178.10% |
| 12 | 0.366 | 0.368 | 0.00240 | 100.66% | 0.210 | 175.11% |
| 21 | 0.372 | 0.375 | 0.00267 | 100.72% | 0.170 | 220.31% |
| 22 | 0.372 | 0.371 | −0.00060 | 99.84% | 0.170 | 218.39% |
| 31 | 0.372 | 0.372 | −0.00023 | 99.94% | 0.349 | 106.35% |
| 32 | 0.372 | 0.404 | 0.03219 | 108.66% | 0.349 | 115.63% |
| 41 | 0.372 | 0.373 | 0.00112 | 100.30% | 0.176 | 211.35% |
| 42 | 0.372 | 0.387 | 0.01533 | 104.12% | 0.176 | 219.40% |

| ARS | EHD | ARS value | ARS − EHD | (ARS/ EHD)% | TP | ARS/ TP (%) |
|---|---|---|---|---|---|---|
| 11 | 0.368 | 0.374 | 0.00578 | 101.57% | 0.210 | 178.10% |
| 12 | 0.366 | 0.368 | 0.00240 | 100.66% | 0.210 | 175.11% |
| 21 | 0.387 | 0.391 | 0.00383 | 100.99% | 0.170 | 229.73% |
| 22 | 0.458 | 0.460 | 0.00202 | 100.44% | 0.170 | 270.73% |
| 31 | 0.476 | 0.478 | 0.00161 | 100.34% | 0.349 | 136.76% |
| 32 | 0.494 | 0.538 | 0.04435 | 108.98% | 0.349 | 154.02% |
| 41 | 0.585 | 0.624 | 0.03890 | 106.65% | 0.176 | 353.34% |
| 42 | 0.798 | 0.866 | 0.06775 | 108.49% | 0.176 | 490.68% |

The Sixth Optical Embodiment

Figure 16:
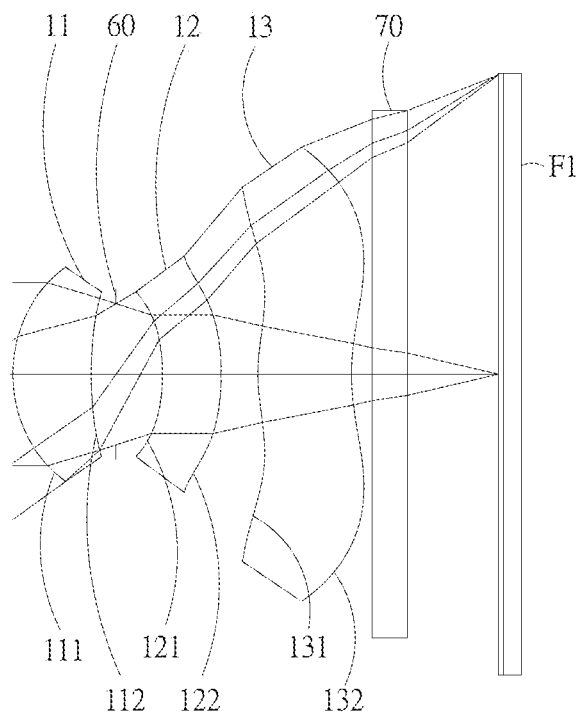
FIG. 16 depicts a configuration diagram of the camera lens of the automobile identification system according to the sixth optical embodiment of the present invention.
Figure 17:
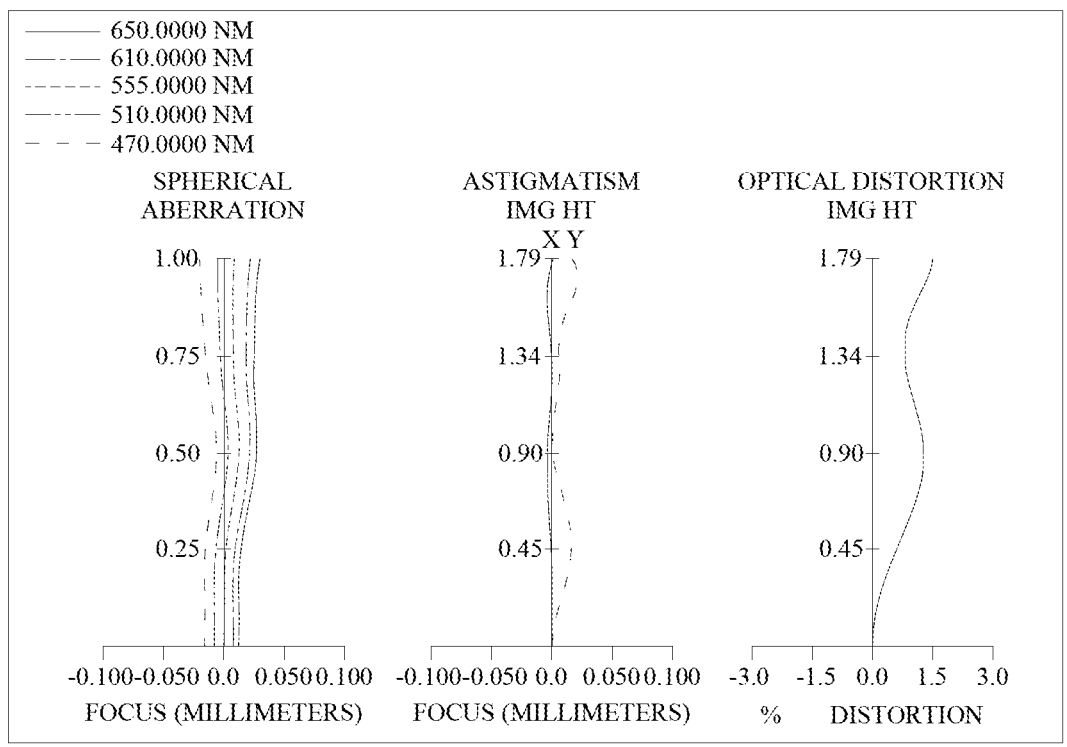
FIG. 17 depicts a curve diagram of the spherical aberration, astigmatism, and optical distortion illustrated sequentially from the left to the right according to the sixth optical embodiment of the present invention.

Please refer to FIG. 16 and FIG. 17. FIG. 16 depicts a configuration diagram of the camera lens of the automobile identification system according to the sixth optical embodiment of the present invention. FIG. 17 depicts a curve diagram of the spherical aberration, astigmatism, and optical distortion illustrated sequentially from the left to the right according to the sixth optical embodiment of the present invention. As shown in FIG. 16, the camera lens includes a first lens 11, an aperture 60, a second lens 12, a third lens 13, an IR-cut filter 70, an image plane, and a first fingerprint sensor F1 or a second fingerprint sensor F2 sequentially displayed from an object side to an image side.

The first lens 11 has positive refractive power and is made of a plastic material. The object side surface 111 thereof is a convex surface and the image side surface 112 thereof is a concave surface, both of which are aspheric.

The second lens 12 has negative refractive power and is made of a plastic material. The object side surface thereof 121 is a concave surface and the image side surface thereof 122 is a convex surface, both of which are aspheric. The image side surface 122 thereof both has an inflection point.

The third lens 13 has positive refractive power and is made of a plastic material. The object side surface 131 thereof is a convex surface and the image side surface 132 thereof is a concave surface, both of which are aspheric. The object side surface 131 thereof has two inflection points and the image side surface 132 thereof has an infection point.

The IR-cut filter 70 is made of glass and is disposed between the third lens 13 and the first fingerprint sensor F1, which does not affect the focal length of the camera lens.

Please refer to the following Table 11 and Table 12.

TABLE 11

Data of the camera lens of the sixth optical embodiment
f = 2.41135 mm; f/HEP = 2.22; HAF = 36 deg

| Surface | | Curvature radius | Thickness (mm) | Material |
|---|---|---|---|---|
| 0 | Object | 1E+18 | 600 | |
| 1 | Lens 1 | 0.840352226 | 0.468 | Plastic |
| 2 | | 2.271975602 | 0.148 | |
| 3 | Aperture | 1E+18 | 0.277 | |
| 4 | Lens 2 | −1.157324239 | 0.349 | Plastic |
| 5 | | −1.968404008 | 0.221 | |
| 6 | Lens 3 | 1.151874235 | 0.559 | Plastic |
| 7 | | 1.338105159 | 0.123 | |
| 8 | IR-cut filter | 1E+18 | 0.210 | BK7 |
| 9 | | 1E+18 | 0.547 | |
| 10 | Image plane | 1E+18 | 0.000 | |

| Surface | Refractive index | Dispersion coefficient | Focal length |
|---|---|---|---|
| 0 | | | |
| 1 | 1.535 | 56.27 | 2.232 |
| 2 | | | |
| 3 | | | |
| 4 | 1.642 | 22.46 | −5.221 |
| 5 | | | |
| 6 | 1.544 | 56.09 | 7.360 |
| 7 | | | |
| 8 | 1.517 | 64.13 | |
| 9 | | | |
| 10 | | | |

Reference wavelength (d-line) = 555 nm.
Shield position: The radius of the clear aperture of the first surface is 0.640 mm

TABLE 12

The aspheric surface parameters of the sixth optical embodiment
Aspheric Coefficients

| Surface | 1 | 2 | 4 | 5 |
|---|---|---|---|---|
| k= | −2.019203E−01 | 1.528275E+01 | 3.743939E+00 | −1.207814E+01 |
| A4= | 3.944883E−02 | −1.670490E−01 | −4.266331E−01 | −1.696843E+00 |
| A6= | 4.774062E−01 | 3.857435E+00 | −1.423859E+00 | 5.164775E+00 |
| A8= | −1.528780E+00 | −7.091408E+01 | 4.119587E+01 | −1.445541E+01 |
| A10= | 5.133947E+00 | 6.365801E+02 | −3.456462E+02 | 2.876958E+01 |
| A12= | −6.250496E+00 | −3.141002E+03 | 1.495452E+03 | −2.662400E+01 |

TABLE 12-continued

The aspheric surface parameters of the sixth optical embodiment
Aspheric Coefficients

| | | | | |
|---|---|---|---|---|
| A14= | 1.068803E+00 | 7.962834E+03 | −2.747802E+03 | 1.661634E+01 |
| A16= | 7.995491E+00 | −8.268637E+03 | 1.443133E+03 | −1.327827E+01 |

| Surface | 6 | 7 |
|---|---|---|
| k= | −1.276860E+01 | −3.034004E+00 |
| A4= | −7.396546E−01 | −5.308488E−01 |
| A6= | 4.449101E−01 | 4.374142E−01 |
| A8= | 2.622372E−01 | −3.111192E−01 |
| A10= | −2.510946E−01 | 1.354257E−01 |
| A12= | −1.048030E−01 | −2.652902E−02 |
| A14= | 1.462137E−01 | −1.203306E−03 |
| A16= | −3.676651E−02 | 7.805611E−04 |

In the sixth optical embodiment, the aspheric surface formula is presented in the same way in the first optical embodiment. In addition, the definitions of parameters in following tables are the same as those in the first optical embodiment. Therefore, similar description shall not be illustrated again.

The values stated as follows may be deduced according to Table 11 and Table 12.

Sixth optical embodiment (Primary reference wavelength: 555 nm)

| |f/f1| | |f/f2| | |f/f3| | |f1/f2| | |f2/f3| | TP1/TP2 |
|---|---|---|---|---|---|
| 1.08042 | 0.46186 | 0.32763 | 2.33928 | 1.40968 | 1.33921 |

| ΣPPR | ΣNPR | ΣPPR/|ΣNPR| | IN12/f | IN23/f | TP2/TP3 |
|---|---|---|---|---|---|
| 1.40805 | 0.46186 | 3.04866 | 0.17636 | 0.09155 | 0.62498 |

| TP2/(IN12 + TP2 + IN23) | (TP1 + IN12)/TP2 | (TP3 + IN23)/TP2 |
|---|---|---|
| 0.35102 | 2.23183 | 2.23183 |

| HOS | InTL | HOS/HOI | InS/HOS | |ODT| % | |TDT| % |
|---|---|---|---|---|---|
| 2.90175 | 2.02243 | 1.61928 | 0.78770 | 1.50000 | 0.71008 |

| HVT21 | HVT22 | HVT31 | HVT32 | HVT32/HOI | HVT32/HOS |
|---|---|---|---|---|---|
| 0.00000 | 0.00000 | 0.46887 | 0.67544 | 0.37692 | 0.23277 |

| PhiA | PhiC | PhiD | TH1 | TH2 | HOI |
|---|---|---|---|---|---|
| 2.716 mm | 3.116 mm | 3.616 mm | 0.25 mm | 0.2 mm | 1.792 mm |

| PhiA/PhiD | TH1 + TH2 | (TH1 + TH2)/HOI | (TH1 + TH2)/HOS | 2(TH1 + TH2)/PhiA | InTL/HOS |
|---|---|---|---|---|---|
| 0.7511 | 0.45 mm | 0.2511 | 0.1551 | 0.3314 | 0.6970 |

| PLTA | PSTA | NLTA | NSTA | SLTA | SSTA |
|---|---|---|---|---|---|
| −0.002 mm | 0.008 mm | 0.006 mm | −0.008 mm | −0.007 mm | 0.006 mm |

The values stated as follows may be deduced according to Table 11 and Table 12.

Related inflection point values of sixth optical embodiment
(Primary reference wavelength: 555 nm)

| | | | | | | | |
|---|---|---|---|---|---|---|---|
| HIF221 | 0.5599 | HIF221/HOI | 0.3125 | SGI221 | 0.1487 | |SGI221|/(|SGI221| + TP2) | 0.2412 |
| HIF311 | 0.2405 | HIF311/HOI | 0.1342 | SGI311 | 0.0201 | |SGI311|/(|SGI311| + TP3) | 0.0413 |
| HIF312 | 0.8255 | HIF312/HOI | 0.4607 | SGI312 | 0.0234 | |SGI312|/(|SGI312| + TP3) | 0.0476 |
| HIF321 | 0.3505 | HIF321/HOI | 0.1956 | SGI321 | 0.0371 | |SGI321|/(|SGI321| + TP3) | 0.0735 |

The values related to arc lengths may be obtained according to Table 11 and Table 12.

| Sixth optical embodiment (Reference wavelength = 555 nm) | | | | | | |
|---|---|---|---|---|---|---|
| ARE | ½(HEP) | ARE value | ARE − ½(HEP) | 2(ARE/ HEP) % | TP | ARE/ TP (%) |
| 11 | 0.546 | 0.598 | 0.052 | 109.49% | 0.468 | 127.80% |
| 12 | 0.500 | 0.506 | 0.005 | 101.06% | 0.468 | 108.03% |
| 21 | 0.492 | 0.528 | 0.036 | 107.37% | 0.349 | 151.10% |
| 22 | 0.546 | 0.572 | 0.026 | 104.78% | 0.349 | 163.78% |
| 31 | 0.546 | 0.548 | 0.002 | 100.36% | 0.559 | 98.04% |
| 32 | 0.546 | 0.550 | 0.004 | 100.80% | 0.559 | 98.47% |
| ARS | EHD | ARS value | ARS − EHD | (ARS/ EHD)% | TP | ARS/ TP (%) |
| 11 | 0.640 | 0.739 | 0.099 | 115.54% | 0.468 | 158.03% |
| 12 | 0.500 | 0.506 | 0.005 | 101.06% | 0.468 | 108.03% |
| 21 | 0.492 | 0.528 | 0.036 | 107.37% | 0.349 | 151.10% |
| 22 | 0.706 | 0.750 | 0.044 | 106.28% | 0.349 | 214.72% |
| 31 | 1.118 | 1.135 | 0.017 | 101.49% | 0.559 | 203.04% |
| 32 | 1.358 | 1.489 | 0.131 | 109.69% | 0.559 | 266.34% |

Figure 18:
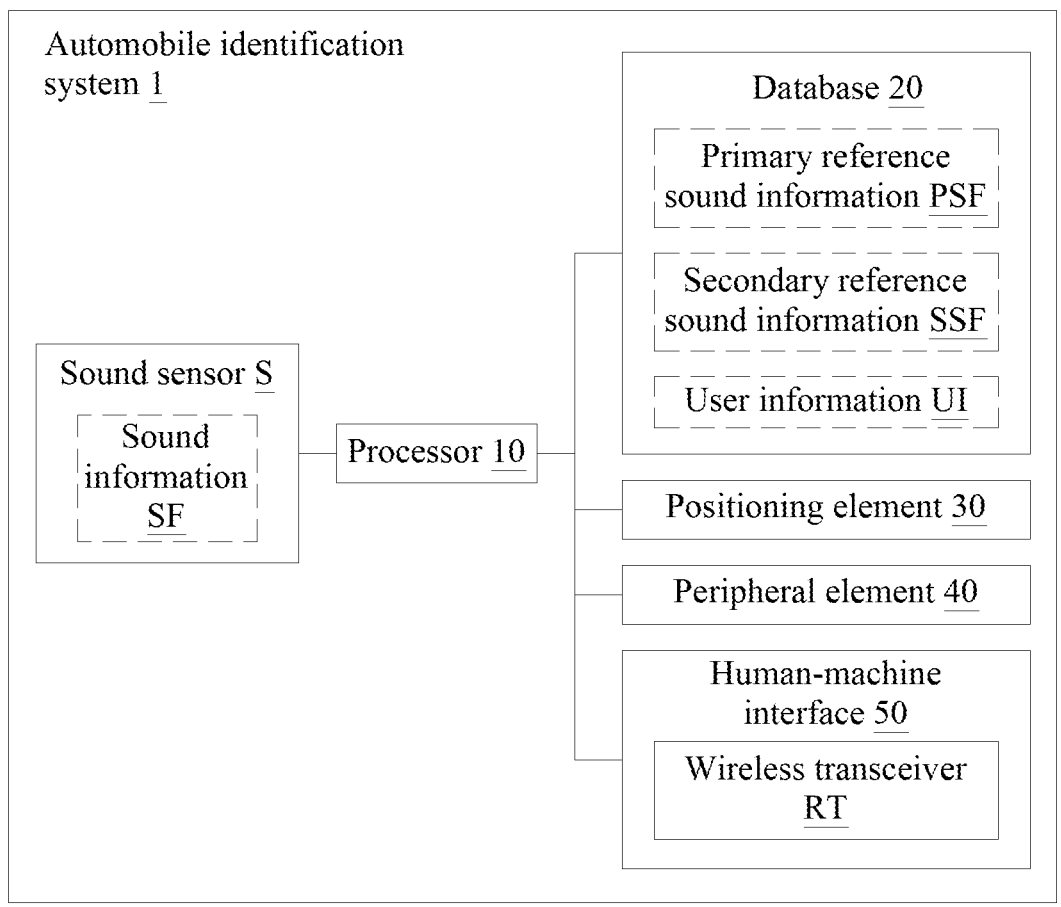
FIG. 18 depicts a block diagram of the automobile identification system according to the third embodiment of the present invention.

Please refer to FIG. 18 which depicts a block diagram of the automobile identification system according to the third embodiment of the present invention. As shown in FIG. 18, the main difference between the third embodiment and the first embodiment lies in the sound sensor S and the primary reference sound information PSF and secondary reference sound information SSF stored in the database; the configuration of the rest of the elements are the same as that of the first embodiment, and thus the description of the configuration of the same elements shall be omitted herein.

Wherein, the sound sensor S is disposed on the exterior and interior of the automobile C to obtain the sound information SF. The database 20 is disposed on the interior of the automobile C and stores the primary reference sound information PSF. The processor 10 is disposed on the interior of the automobile C and electrically connected to the database 20 and the sound sensor S. When the processor 10 determines that the sound information SF matches the primary reference sound information PSF, the processor 10 obtains a use authentication to make the door of the automobile C open and the engine of the automobile C activated; when the processor 10 determines that the sound information SF does not match the primary reference sound information PSF, the processor 10 makes the door of the automobile C locked.

In one embodiment, the processor 10 may determine whether the sound information SF matches the primary reference sound information PSF according to the waveform of the primary reference sound information PSF. In another embodiment, the processor 10 may determine whether the sound information SF matches the primary reference sound information PSF according to the waveform and frequency of the primary reference sound information PSF. It may also be referred to other features of the primary reference sound information PSF as a basis for the determination, and is not limited to the scope of the present invention.

When the processor 10 determines that the sound information SF matches the primary reference sound information PSF, the processor 10 obtains a use authentication to confirm that the person who attempts to enter the automobile C is the driver. The positioning element 30 performs positioning for the automobile C and establishes a map according to the surrounding environment of automobile C; the positioning element 30 may also acquire the information on the weather and temperature of the place where the automobile C is located, and the driver may better understand the environment and traffic; the driver controls the operation of the peripheral element 40 through the human-machine interface 50. Alternatively, the driver may send a control signal to the wireless transceiver RT through an external electronic device, thus transmitting a control signal to the processor 10; the processor 10 controls the operation of the peripheral element 40 according to the control signal. Meanwhile, the processor 10 records the setting of the peripheral element 40 which is then stored as the user information UI of the database 20; when the driver sends the sound information SF to the sound sensor S again, the processor 10 may extract the user information UI from the database 20 according to the sound information SF; then, the processor 10 displays the user information UI on the human-machine interface 50.

In addition, the database 20 further includes a plurality of secondary reference sound information SSF to be provided to the processor 10. The plurality of secondary reference sound information SSF are sound information of other users authorized by the driver to use the automobile C. Herein, the operational mechanism of the processor 10, the secondary reference sound information SSF, and sound sensor S is described in detail as follows: (1) When the processor 10 determines that the sound information SF matches one of the plurality of secondary reference sound information SSF, the processor 10 obtains the authorized use authentication and makes the door of the automobile C open and the engine of the automobile C activated. (2) When the processor 10 determines that the sound information SF does not match one of the plurality of secondary reference sound information SSF, the person who attempts to enter the automobile C is not the user authorized by the driver to use the automobile C; the processor 10 does not obtain the use authentication and makes the door of the automobile C locked.

Similarly, when the processor 10 determines that the sound information SF matches one of the plurality of secondary reference sound information SSF, the processor 10 obtains the authorized use authentication, confirming that the person who attempts to enter the automobile C is the user authorized by the driver to use the automobile C; the positioning element 30 performs positioning for the automobile C and establishes a map according to the surrounding environment of automobile C; the positioning element 30 may also acquire the information on the weather and temperature of the place where the automobile C is located, and the user may better understand the environment and traffic; the user controls the operation of the peripheral element 40 through the human-machine interface 50; alternatively, the user may send a control signal to the wireless transceiver RT through an external electronic device, thus transmitting a control signal to the processor 10; the processor 10 controls the operation of the peripheral element 40 according to the control signal. Meanwhile, the processor 10 records the setting of the peripheral element 40 which is then stored as the user information UI of the database 20; when the driver sends the sound information SF to the sound sensor S again, the processor 10 may extract the user information UI from the database 20 according to the sound information SF; then, the processor 10 displays the user information UI on the human-machine interface 50.

In sum, the automobile identification system 1 of the present invention may obtain the first fingerprint image I1 and the second fingerprint image I2 through the first fingerprint sensor F1 and the second fingerprint sensor F2 disposed on the exterior and interior of the automobile C. Together with the data stored in the database 20 and the determination by the processor, it may be confirmed whether the person who attempts to enter the automobile is a driver without the need for a conventional key to open the door of the automobile or activate the automobile. In sum, the automobile identification system of the present invention has the advantages as mentioned above which benefit driving safety.

The above description is merely illustrative rather than restrictive. Any spirit and scope without departing from the present invention as to equivalent modifications or alterations are intended to be included in the following claims.

What is claimed is:

1. An automobile identification system for an automobile, comprising:
   at least one first fingerprint sensor disposed on an exterior of the automobile to generate a first fingerprint image;
   at least one second fingerprint sensor disposed on an interior of the automobile to generate a second fingerprint image;
   a database disposed on the interior of the automobile and storing at least one primary reference fingerprint image corresponding to a driver of the automobile and at least one secondary reference fingerprint image corresponding to one other user authorized by the driver; and
   a processor disposed on the interior of the automobile and electrically connected to the database, each of the first fingerprint sensors, and each of the second fingerprint sensors to receive the first fingerprint image, the second fingerprint image, the primary reference fingerprint image and the secondary reference fingerprint image;
   wherein when the processor determines that the first fingerprint image matches the primary reference fingerprint image or the secondary reference fingerprint image, the processor obtains a pass authentication and makes a door of the automobile open;
   when the processor determines that the second fingerprint image matches the primary reference fingerprint image or the secondary reference fingerprint image, the processor obtains a use authentication and makes an engine of the automobile activated;
   wherein the use authentication is obtained without a mode selection or a user ID selection prior to receiving the second fingerprint image;
   wherein the processor confirms that it is the driver who attempts to enter the automobile when both the first fingerprint image and the second fingerprint image match with the primary reference fingerprint image, and the processor confirms that it is the other user authorized by the driver who attempts to enter the automobile when both the first fingerprint image and the second fingerprint image match with the secondary reference fingerprint image.

2. The automobile identification system according to claim 1, wherein when the processor determines that the first fingerprint image does not match the primary reference fingerprint image, the processor does not obtain the pass authentication.

3. The automobile identification system according to claim 1, wherein when the processor determines that the first fingerprint image matches the primary reference fingerprint image but the second fingerprint image does not match the primary reference fingerprint image, the processor obtains the pass authentication without obtaining the use authentication, and each of the second fingerprint sensors restarts sensing fingerprint images.

4. The automobile identification system according to claim 1, wherein the processor obtains user information according to the first fingerprint image or the second fingerprint image.

5. The automobile identification system according to claim 1, wherein the database further comprises a plurality of the secondary reference fingerprint images to be provided to the processor.

6. The automobile identification system according to claim 5, wherein when the processor determines that the first fingerprint image matches one of the plurality of secondary reference fingerprint images, the processor obtains the pass authentication and makes the door of the automobile open; when the processor determines that the second fingerprint image matches one of the plurality of secondary reference fingerprint images, the processor obtains an authorized use authentication and makes the engine of the automobile activated.

7. The automobile identification system according to claim 6, wherein when the processor determines that the first fingerprint image does not match one of the plurality of secondary reference fingerprint images, the processor does not obtain the pass authentication and makes the door of the automobile locked.

8. The automobile identification system according to claim 6, wherein when the processor determines that the first fingerprint image matches one of the plurality of secondary reference fingerprint images but the second fingerprint image does not match one of the plurality of secondary reference fingerprint images, the processor obtains the pass authentication without obtaining the authorized use authentication, and each of the second fingerprint sensors restarts sensing fingerprint images, or the processor restarts searching for another frame of the plurality of secondary reference fingerprint images in the database.

9. The automobile identification system according to claim 1, further comprising a positioning element, wherein when the processor obtains the pass authentication and the use authentication, the positioning element positions a location and creates a map for the automobile.

10. The automobile identification system according to claim 1, further comprising a wireless transceiver, an external electronic device, and a peripheral element, wherein the wireless transceiver is disposed on the interior of the automobile, wirelessly connected to the external electronic device, and electrically connected to the processor; the peripheral element is disposed on the automobile; when the processor obtains the pass authentication and the use authentication, the external electronic device transmits a control signal to the processor through the wireless transceiver and the processor makes the peripheral element operate according to the control signal; or when the processor obtains the pass authentication and the use authentication, the processor makes the peripheral element operate.

11. The automobile identification system according to claim 10, wherein the peripheral element comprises a driver's seat, a passenger side door, a passenger side window, rear-view mirrors, air-conditioning equipment, a dashboard, a driving recorder, a lighting device, a multimedia player, an airbag, or a car gearbox.

12. The automobile identification system according to claim 1, wherein each of the first fingerprint sensors and each of the second fingerprint sensors are optically fingerprinting identifying and have a camera lens and the camera lens has at least three lenses with refractive power.

13. The automobile identification system according to claim 12, wherein each of the lenses satisfies the following conditions:

$$1.0 \le f/HEP \le 10.0;$$

$$0\deg \le HAF \le 150\deg;$$

$$0mm \le PhiD \le 18mm;$$

$$0 \le PhiA/PhiD \le 0.99; \text{ and}$$

$$0.9 \le 2(ARE/HEP) \le 2.0;$$

wherein f is a focal length of the camera lens; HEP is an entrance pupil diameter of the camera lens; HAF is a half maximum field of view of the camera lens; PhiD is a maximum value of a minimum side length of an outer periphery of a lens base perpendicular to an optical axis of the camera lens; PhiA is a maximum effective diameter of the camera lens nearest to a lens surface of an image plane; ARE is an arc length along an outline of the lens surface, starting from an intersection point of any lens surface of any lens and the optical axis in the camera lens, and ending at a point with a vertical height which is a distance from the optical axis to half the entrance pupil diameter.

14. The automobile identification system according to claim 1, wherein each of the first fingerprint sensors and each of the second fingerprint sensors are capacitive or resistive fingerprinting identification sensors.

15. An automobile identification system for an automobile, comprising:
at least one fingerprint sensor disposed on the automobile to generate a fingerprint image;
a database disposed on an interior of the automobile and storing at least one first reference image corresponding to an owner of the automobile and at least one second reference image corresponding to a guest of the automobile;
a processor disposed on the interior of the automobile and electrically connected to the database and each of the fingerprint sensors;
wherein when the processor determines that the fingerprint image matches the first reference image, the processor obtains a first access right and has access to an owner mode; when the processor determines that the fingerprint image matches the second reference image, the processor obtains a second access right different from the first access right and has access to a guest mode;
wherein the first access right and the second access right are obtained without a selection of the owner mode, the guest mode or a user ID prior to receiving the fingerprint image;
wherein the processor confirms that it is the driver who attempts to enter the automobile when the first fingerprint image matches with the first reference image, and the processor confirms that it is the guest who attempts to enter the automobile when the first fingerprint image matches with the second reference image.

16. The automobile identification system according to claim 15, wherein each of the fingerprint sensors respectively is a first fingerprint sensor and a second fingerprint sensor, the first fingerprint sensor is disposed on an exterior of the automobile to generate a first fingerprint image, and the second fingerprint sensor is disposed on the interior of the automobile to generate a second fingerprint image.

17. The automobile identification system according to claim 16, wherein when the processor determines that the first fingerprint image matches the first reference image or the second reference image, the processor obtains a pass authentication to make a door of the automobile open.

18. The automobile identification system according to claim 17, wherein when the processor obtains the pass authentication and determines that the second fingerprint image matches the first reference image, the processor obtains the first access right and has access to the owner mode and the processor makes the automobile travel at a high speed or at a low speed.

19. The automobile identification system according to claim 18, further comprising a positioning element, wherein when the processor obtains the pass authentication and the first access right, the positioning element positions a location and creates a map for the automobile.

20. The automobile identification system according to claim 18, further comprising a wireless transceiver, an external electronic device, and a peripheral element, wherein the wireless transceiver is disposed on the interior of the automobile, wirelessly connected to the external electronic device, and electrically connected to the processor; the peripheral element is disposed on the automobile; when the processor obtains the pass authentication and the first access right, the external electronic device transmits a control signal to the processor through the wireless transceiver and the processor makes the peripheral element operate according to the control signal; or when the processor obtains the pass authentication and the first access right, the processor makes the peripheral element operate.

21. The automobile identification system according to claim 20, wherein the peripheral element comprises a driver's seat, a passenger side door, a passenger side window, rear-view mirrors, air-conditioning equipment, a dashboard, a driving recorder, a lighting device, a multimedia player, an airbag, or a car gearbox.

22. The automobile identification system according to claim 17, wherein when the processor obtains the pass authentication and determines that the second fingerprint image matches the second reference image, the processor obtains the second access right and has access to the guest mode and the processor makes the automobile travel at a low speed.

23. The automobile identification system according to claim 22, further comprising a positioning element, wherein when the processor obtains the pass authentication and the second access right, the positioning element positions a location for the automobile and creates a map and the automobile is only able to travel to a plurality of restricted locations on the map.

24. The automobile identification system according to claim 16, wherein each of the first fingerprint sensors and each of the second fingerprint sensors are optically fingerprinting identifying and have a camera lens and the camera lens has at least three lenses with refractive power.

25. The automobile identification system according to claim 24, wherein each of the lenses satisfies the following conditions:

$$1.0 \le f/HEP \le 10.0;$$

$$0\deg \le HAF \le 150\deg;$$

$$0mm \le PhiD \le 18mm;$$

$$0 \le PhiA/PhiD \le 0.99; \text{ and}$$

$$0.9 \le 2(ARE/HEP) \le 2.0;$$

wherein f is a focal length of the camera lens; HEP is an entrance pupil diameter of the camera lens; HAF is a half maximum field of view of the camera lens; PhiD is a maximum value of a minimum side length of an outer periphery of a lens base perpendicular to an optical axis of the camera lens; PhiA is a maximum effective diameter of the camera lens nearest to a lens surface of an image plane; ARE is an arc length along an outline of the lens surface, starting from an intersection point of any lens surface of any lens and the optical axis in the camera lens, and ending at a point with a vertical height which is a distance from the optical axis to half the entrance pupil diameter.

26. The automobile identification system according to claim 16, wherein each of the first fingerprint sensors and each of the second fingerprint sensors are capacitive or resistive fingerprinting identifying.

* * * * *